(12) United States Patent
Imaizumi et al.

(10) Patent No.: US 6,183,040 B1
(45) Date of Patent: Feb. 6, 2001

(54) DEVICE FOR PREVENTING SANDWICHED CONDITION

(75) Inventors: Tomoaki Imaizumi; Eiji Itami; Ryoichi Fukumoto; Katsuhisa Yamada; Masao Ohhashi; Shintaro Suzuki, all of Aichi-ken (JP)

(73) Assignee: Aisin Seiki Kabushiki Kaisha, Kariya (JP)

(*) Notice: Under 35 U.S.C. 154(b), the term of this patent shall be extended for 0 days.

(21) Appl. No.: 09/450,717

(22) Filed: Nov. 30, 1999

(30) Foreign Application Priority Data

Nov. 30, 1998 (JP) .................................................. 10-340533

(51) Int. Cl.[7] ...................................................... B60J 5/06
(52) U.S. Cl. .................................. 296/155; 49/26; 49/28; 318/468
(58) Field of Search ................................ 296/155; 49/26, 49/27, 28, 360; 318/468, 469

(56) References Cited

U.S. PATENT DOCUMENTS 5,069,000 * 12/1991 Zuckerman ............................. 49/28
5,557,888 * 9/1996 Ruchat et al. ................... 296/155 X
5,592,060 * 1/1997 Racine et al. ......................... 318/469
5,616,997 * 4/1997 Jackson et al. ..................... 49/28 X
5,836,639 * 11/1998 Kleefeldt et al. .................... 296/155
6,089,649 * 7/2000 Hamada et al. ..................... 296/155

FOREIGN PATENT DOCUMENTS 8-260810   10/1996 (JP) .

* cited by examiner

Primary Examiner—Joseph D. Pape
(74) Attorney, Agent, or Firm—Burns, Doane, Swecker & Mathis, LLP

(57) ABSTRACT

A device for preventing a pinched or sandwiched condition includes a first member having therein an opening area; a second member opening and closing the opening area of the first member; and an electronic control device detecting a sandwich condition between the first member and the second member which is in movement at a speed for closing the opening area of the first member when a deceleration side condition of the speed of the second member exceeds a threshold value which is obtained based on an acceleration side condition of the speed of the second member.

12 Claims, 20 Drawing Sheets

DEVICE FOR PREVENTING SANDWICHED CONDITION

This application is based on and claims priority under 35 U.S.C. § 119 with respect to Japanese Application No. 10(1998)-340533 filed on Nov. 30, 1998, the entire content of which is incorporated herein by reference.

FIELD OF THE INVENTION

The present invention generally relates to a vehicle door. More particularly, the present invention pertains to a device for preventing a sandwiched or pinched condition in a vehicle door.

BACKGROUND OF THE INVENTION

Sometimes a substance, device or a part of human body is held between the inner periphery of an opening area and a moving element or member (e.g., a vehicle window or door such as a sliding window or door) which is adapted to be moved for closing the opening area. To prevent damage of the substance or device, or injury to the part of the human body resulting from such a sandwiched condition, the moving member is designed to be reversed by operation of the drive device for preventing the sandwiched condition. Such a device is disclosed in, for example, Japanese Patent Laid-Open Publication No. Hei. 8-260810 published without examination on Oct. 8, 1996.

In this device, the sandwiched condition is recognized when a change of rotational speed of an electric motor which moves the moving member is found. When the moving body is in the form of a sun-roof, a power window pane, or a slide door which is mounted on a vehicle, when the vehicle runs on a rough road or a sloping road, the rotational speed of the motor changes, with the result that the moving body which is in the course of closing the opening area is reversed in spite of no fear of the sandwiched condition.

Accordingly, a need exists for a device for preventing the sandwiched condition for vehicles which is free from the foregoing drawback and disadvantage.

SUMMARY OF THE INVENTION

Considering the foregoing, the present invention provides a device for preventing a sandwiched or pinched condition that includes a first member provided with an opening, a second member opening and closing the opening area of the first member, and an electronic control device for detecting a sandwiched condition between the first member and the second member which is in movement at a speed for closing the opening area of the first member. The electronic control device detects the sandwiched condition when the deceleration side condition of the speed of the second member exceeds a threshold value which is obtained based on an acceleration side condition of the speed of the second member.

According to another aspect of the invention, a vehicular slide door apparatus includes a plurality of guide rails mounted on a lateral side of a vehicle body possessing an opening area, a slide door mounted on the guide rails for sliding movement in a lengthwise direction of the vehicle body between an open position in which access through the opening area is permitted and a closed position in which access through the opening area is prevented, and a drive device operatively associated with the slide door to move the slide door between the closed position and the open position, with the slide door moving at a speed having an acceleration side condition. An electronic control device detects a sandwiched condition between the slide door and a portion of the vehicle body during sliding movement of the slide door on the basis of a threshold value which is obtained based on the acceleration side condition of the speed of the slide door.

According to a further aspect of the invention, a vehicular slide door apparatus includes a slide door mounted on a lateral side of a vehicle body which possesses an opening area for sliding movement in a lengthwise direction of the vehicle body between an open position in which access through the opening area is permitted and a closed position in which access through the opening area is prevented, a drive device operatively associated with the slide door to move the slide door between the closed position and the open position, and an electronic control device that detects a sandwiched condition between the slide door and a portion of the vehicle body during sliding movement of the slide door. The electronic control device detects the sandwiched condition based on the speed of slide door.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE INVENTION

Figure 1:
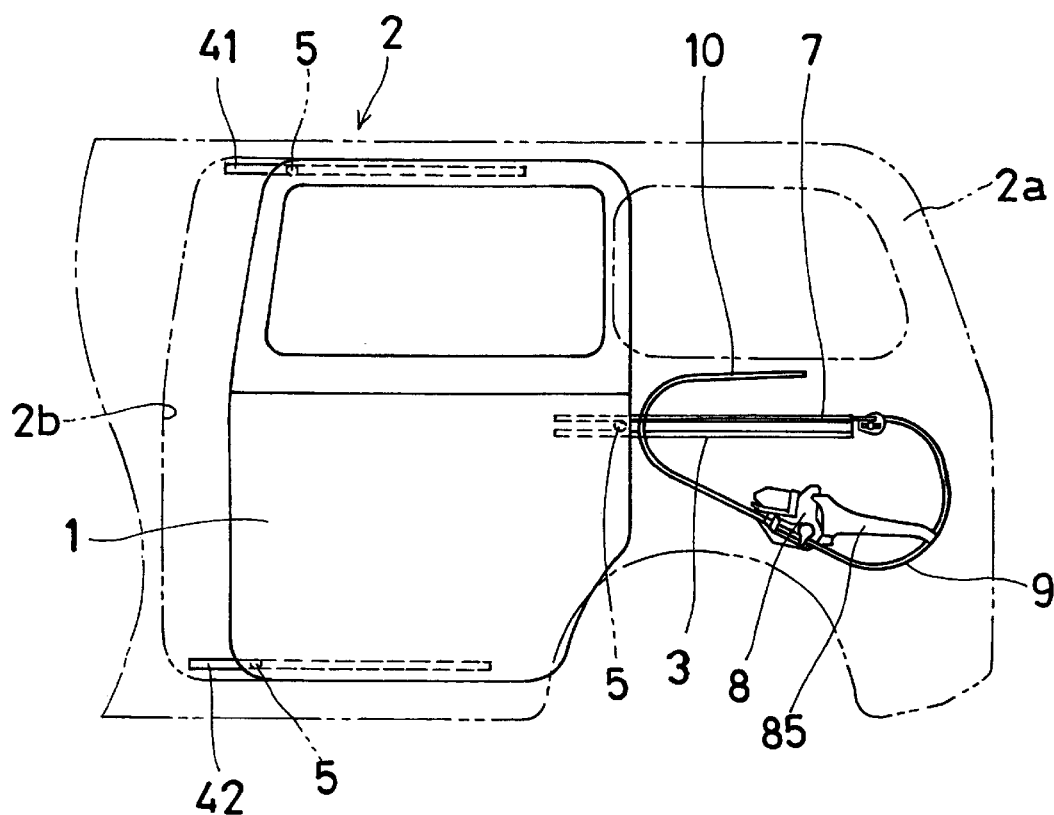
FIG. 1 is a side view of a vehicle body at which is located a slide door apparatus according to the present invention.
Figure 2:
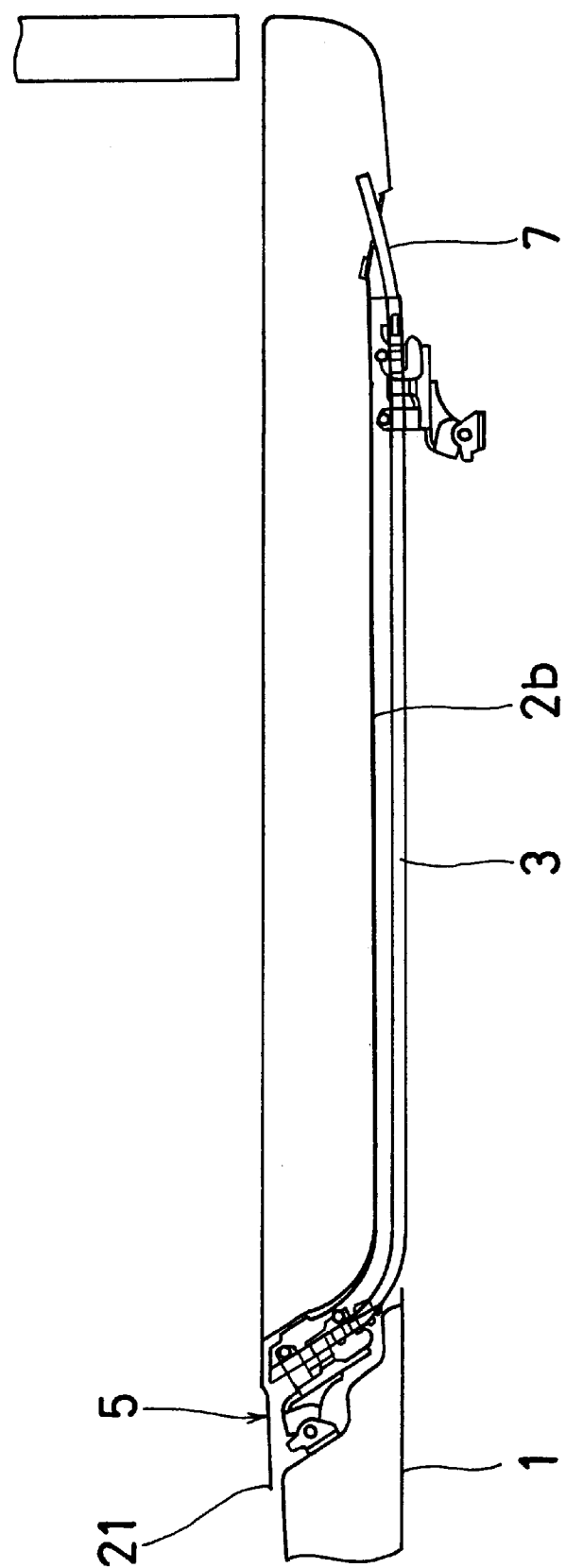
FIG. 2 is a horizontal cross-sectional view of the slide door apparatus shown in FIG. 1.

FIGS. 1 and 2 illustrate the rear portion of the vehicle body 2 of a van type vehicle. The lateral side 2a of the vehicle body 2 is provided with an opening area 2b possessing a substantially rectangular shape. The opening area 2b is adapted to be closed and opened by a slide door 1. The slide door 1 is supported by an upper guide rail 41, a lower guide rail 42 and a center guide rail 3 so as to be movable in the vehicle lengthwise direction corresponding to the right-and-left direction in FIG. 1.

The upper guide rail 41 is arranged along the upper periphery of the opening area 2b at a position closely adjacent the opening area 2a and is secured to the lateral side 20 of the vehicle body 2 by way of suitable connecting devices such as screws. The lower guide rail 42 is arranged along the lower periphery of the opening area 2b at a position closely adjacent the opening area 2a and is secured to the lateral side 2a of the vehicle body 2 by way of suitable connecting devices such as screws. The center guide rail 3 is positioned at the rear side of the opening area 2b and is secured to the lateral side 2a of the vehicle body 2 by way of suitable connecting devices such as screws.

The slide door 1 is provided with three guide roller units 5 which slidably engage the respective guide rails 3, 41, 42, thereby allowing the slide door 1 to slide along the guide rails 3, 41, 42. The guide rails 3, 41, 42 are arranged parallel to each other and extend in the vehicle lengthwise direction. For establishing a coplanar relationship between the outer surface of the slide door and the outer surface of the lateral side 2a of the vehicle body 2 when the opening area 2b is fully closed by the slide door 1, the front end of each of the guide rails 3, 41, 42 is bent toward the interior or inner space of the vehicle body 2. When the opening area 2b is fully opened, the slide door 1 is positioned at the rear side of the opening area 2b and is positioned in an overlapping or layered condition relative to the lateral side 2a of the vehicle body 2.

Figure 3:
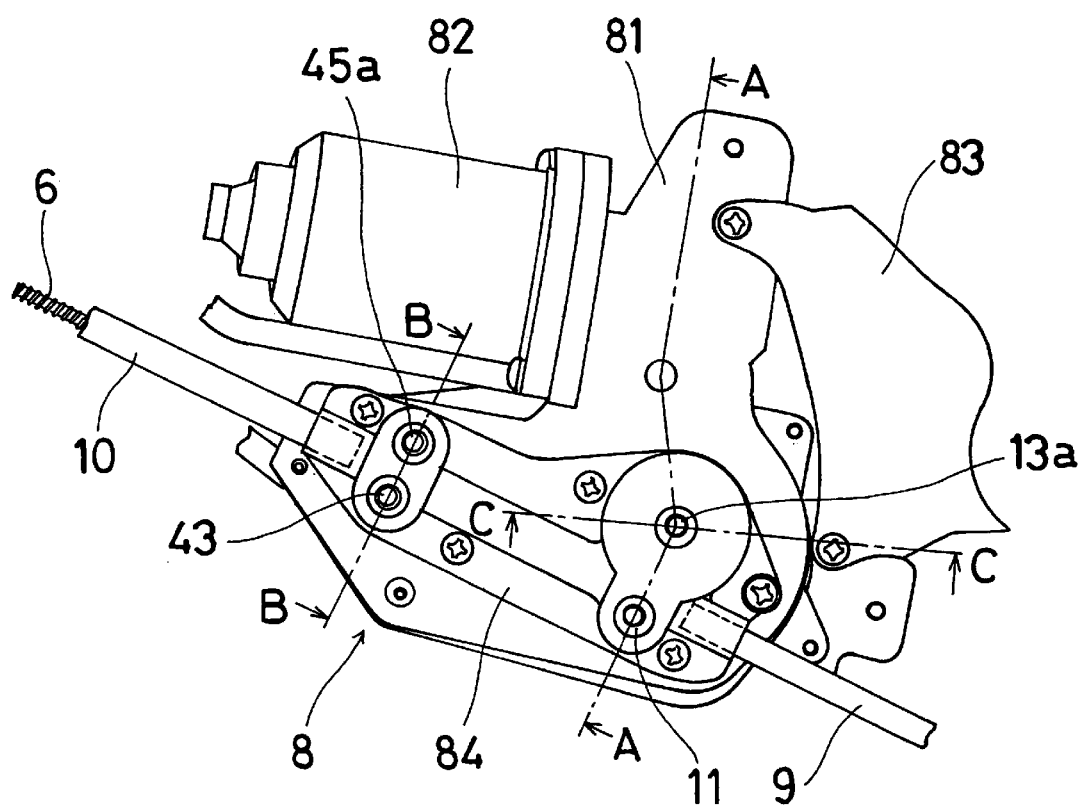
FIG. 3 is a front view of the driving device associated with the slide door apparatus shown in FIG. 1.

The roller unit 5 which slides along the center guide rail 3 is connected to one end of a geared cable 6, seen in FIG. 3, which passes through several guide pipes 7, 9, 10. The other end of the geared cable 6 forms a free end of the cable. The geared cable 6 is connected to a drive device 8, the details of which will be described below, at a position between the guide pipes 7, 9. The guide pipe 7 extends along the center guide rail 3 and is secured to the center guide rail 3. The guide pipe 9 is fixed to the inside of the vehicle body 2, with one end of the guide pipe 9 passing therethrough for being connected to the guide pipe 7 at the rear portion of the guide rail 3. The other end of the guide pipe 9 is connected to the drive device 8. The guide pipe 10 is fixed inside the vehicle body 2 and is connected to the drive device 8.

When the drive device 8 is turned on, the geared cable 6 is moved in one direction, which causes movement of the center positioned roller unit 5 along the center guide rail 3. As a result, the slide door 1 moves along the guide rails 3, 41, 42, thereby opening the opening area 2b in the lateral side 2a of the vehicle body. When the drive device 8 is operated in the opposite direction, the geared cable 6 is moved in the opposite direction, and this causes movement of the center positioned roller unit 5 along the center guide rail 3 in the opposite direction. The slide door 1 is thus moved along the guide rails 3, 41, 42, thereby closing the opening area 2b in the lateral side 2a of the vehicle body.

Referring to FIGS. 3–7, the drive device 8 includes a casing 81 and an electric motor 82 functioning as an electrical driving source. The casing 81 is fixedly mounted on a bracket 83 which is secured to the lateral side 2a of the vehicle body 2. The motor 82 is fastened to the casing 81. The casing 81 includes a first housing part 81a and a second housing part 81b which are coupled or connected with each other by way of bolts 81c. An inner space D is defined within the housing that results from connection of the two housing parts 81a, 81b. The housing 81a of the casing 8 is connected with a cover 84 by a bolt 84a, thereby defining an accommodating space E between the housing 81a and the cover 84.

A shaft 11 is journalled in the casing 81. The shaft 11 passes through the housing 81a, the inner space D, and the accommodating space E. One end portion 11a of the shaft 11 is journalled in the cover 84 via a bush 84b, while the other end portion 11b of the shaft 11 is journalled in the housing 11b via a bush 81d. A portion 11c of the shaft 11 is also journalled in the housing 81b via a bush 81e. Between the end portions 11a, 11c, the shaft 11 is provided with a portion 11e in the form of a serration which is positioned in the accommodating space E. Between the portions 11c, 11b, the shaft 11 is provided with a supporting portion 11f and a serrated portion 11g.

An output gear 12 is mounted on the serrated portion 11e of the shaft 11 so that the output gear 12 and the serrated portion 11e of the shaft 11 are rotatable together. In the accommodating space E, a driven gear 13 is rotatably supported on the housing 81a and the cover 84 via a pin 13a, and is positioned in opposition to the output gear 12. The geared cable 6 which is accommodated in the accommodating space E is in meshing engagement with both the output gear 12 and the driven gear 13.

A rotor 14 formed of a magnetic material is mounted on the serrated portion 11g of the shaft 11 so that the rotor 14 rotates together with the serrated portion 11g of the shaft 11. The upper and lower surfaces of the rotor 14 are provided with respective annular grooves 14b, 14c which communicate with each other by a plurality of circumferentially arranged arc-shaped slots 14a having a common center point. An annular geared projection 14d is formed on the upper surface of the rotor 14 and is positioned outside the groove 14c.

Figure 5:
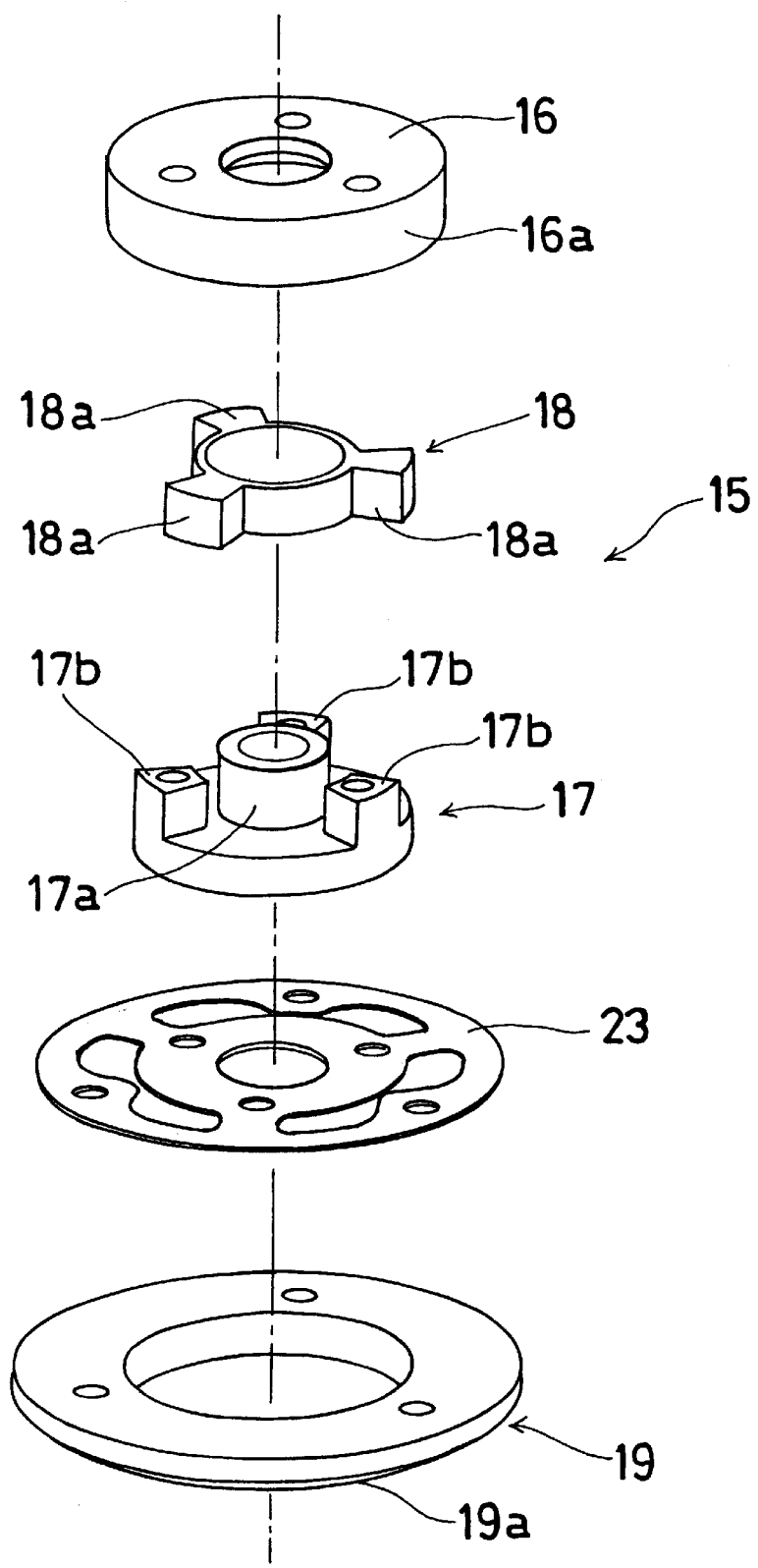
FIG. 5 is an exploded perspective view of the second disk assembly employed in the driving device shown in FIG. 3.
Figure 6:
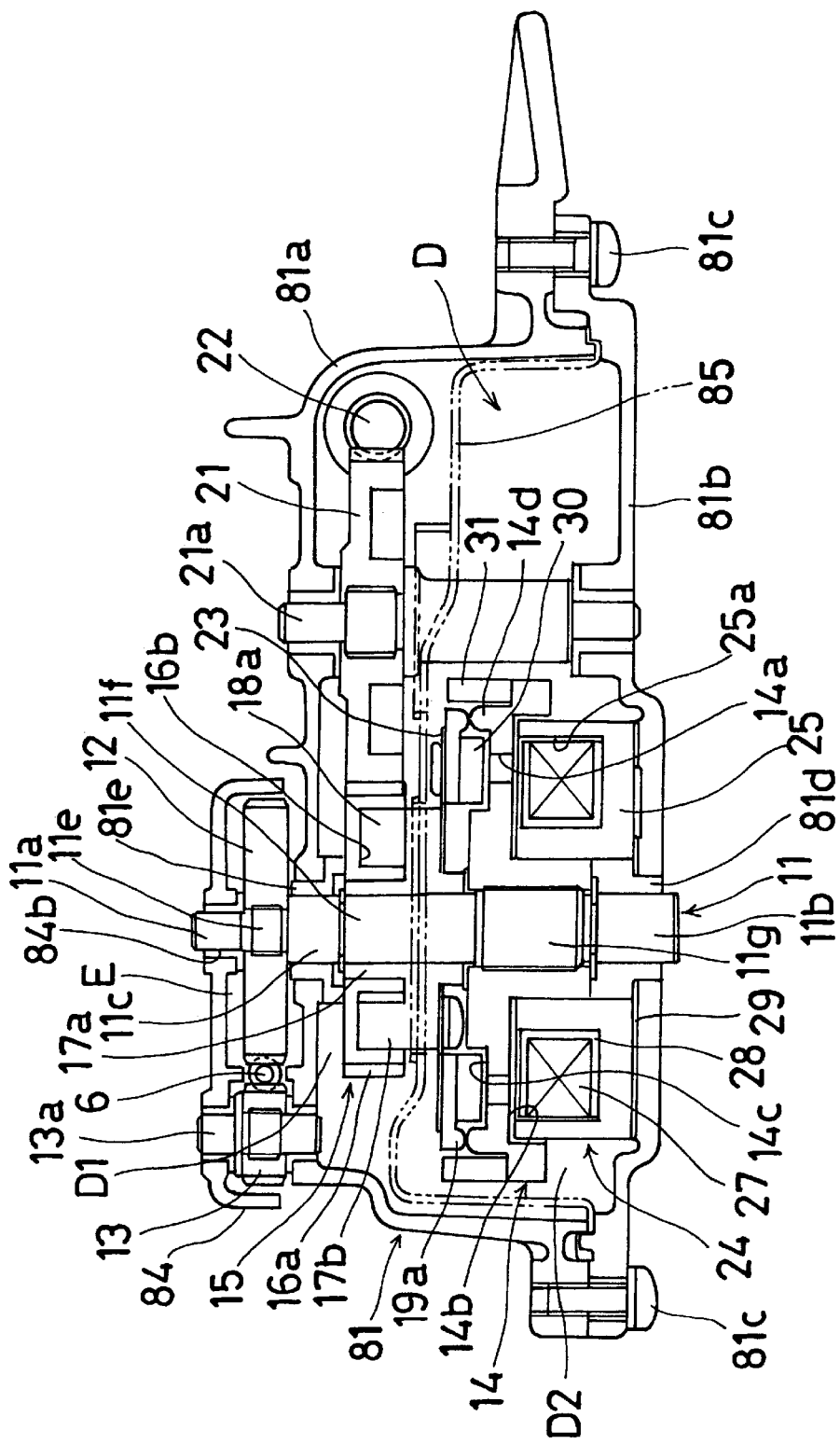
FIG. 6 is a cross-sectional view taken along the section line VI—VI in FIG. 3.
Figure 7:
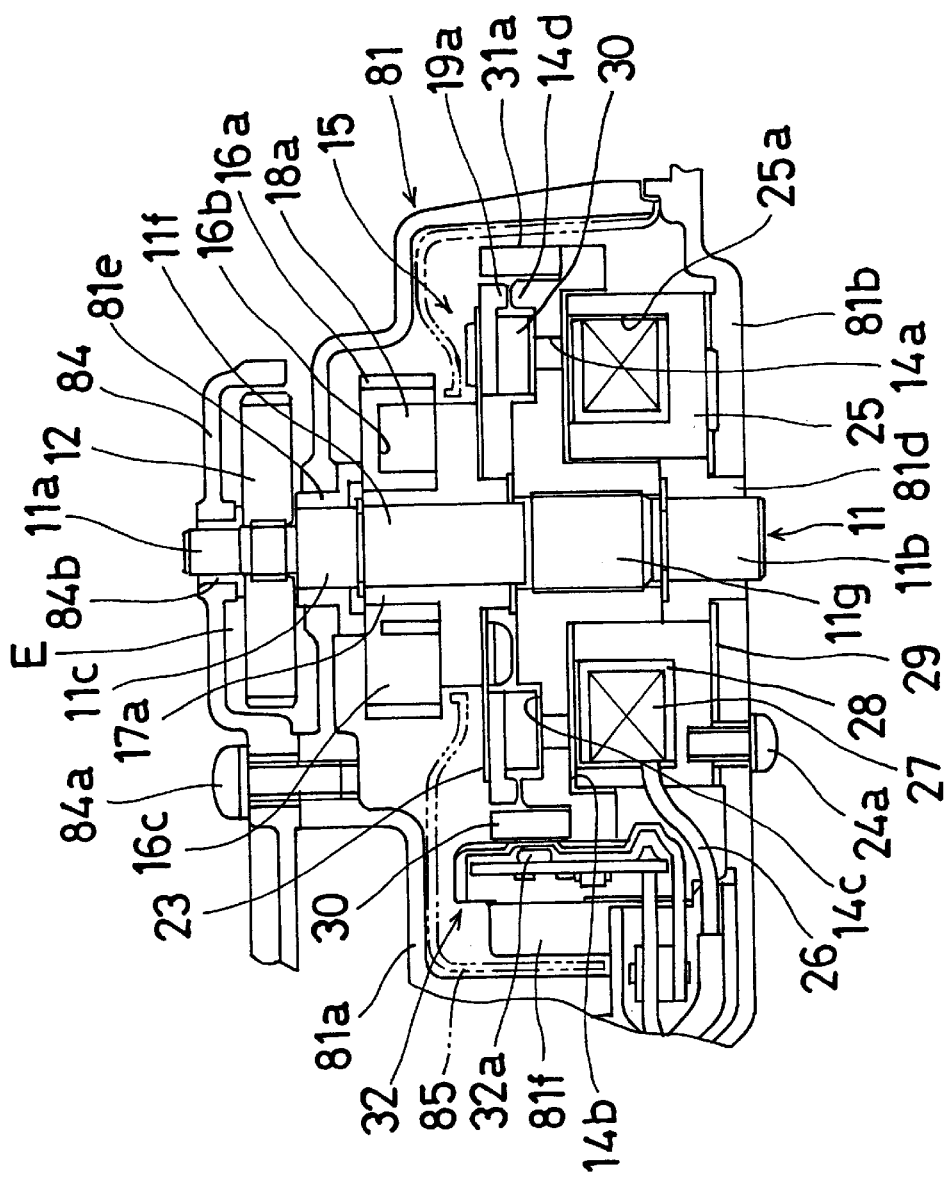
FIG. 7 is a cross-sectional view taken along the section line VII—VII in FIG. 3.

A disk assembly 15 is mounted on the supporting portion 11f of the shaft 11 so as to rotate relative to the supporting portion 11f. As best shown in FIG. 5, the disk assembly 15 includes an input wheel 16, an output wheel 17, a movable plate 19, and an elastic member 18 formed of, for example, rubber. The output wheel 17 is rotatably mounted on the supporting portion 11f of the shaft 11.

The input wheel 16 is rotatably mounted on a boss portion 17a of the output wheel 17. The outer periphery of the input wheel 16 possesses a geared configuration 16a which is in indirect meshing engagement with a worm gear 22 via an idle gear 21. The idle gear 21 is positioned in the inner space D of the casing 81 and is rotatably supported on the two housing parts 81a, 81b via a pin 21a. The worm gear 22 which is in meshing engagement with the idle gear 21 is fixedly mounted on the output shaft of the motor 82 which extends into the inner space D of the casing 81. The idle gear 21 and the worm gear 22 constitute a speed reduction gear train 20.

The input wheel 16 is provided in its lower surface with an annular groove 16b into which a plurality of projections 16c extend. The output wheel 17 is provided with equipitched projections 17b each of which, when fitted in the annular groove 16b in the input wheel 16, is in opposition to two adjacent projections 16c, 16c. An elastic member 18 which is accommodated in the annular groove 16b of the input wheel 16 has equi-pitched damper portions 18a each of which is positioned between two adjacent projections 16c, 17b.

The movable plate 19 is in the form of a circular plate. The upper surface of the movable plate 19 is secured to a ring-shaped leaf spring 23 by way of screws which is riveted to the output wheel 17, thus allowing the movable plate 19 to rotate together with the output wheel 17. The movable plate 19 is capable of being deformed in its axial direction, which enables the movable plate 19 to move in the axial direction. The movable plate 19 is provided at its lower surface with a ring-shaped or annular geared portion 19a.

When the electric motor 82 is turned on, the resulting rotational torque is transmitted, by way of the speed-reduction gear train 20, to the input wheel 16. The resulting rotation of the input wheel 16 is transmitted from the projections 16a of the input wheel 16 to the projections 17b of the output wheel 17 via the damper portions 18a of the elastic member 18, thereby rotating the output wheel 17. At this time, the damper portions 18a of the elastic member 18 absorb shocks to some extent which inevitably occur between the input wheel 16 and the output wheel 17.

The rotation of the output wheel 17 is transmitted by way of the leaf spring 23 to the movable plate 19. This causes rotation of the movable plate 19, thereby rotating the rotor 14 which is in meshing engagement with the movable plate 19 by engagement of the geared portion 19a of the movable plate 19 with the geared projection 14d on the rotor 14.

A ring-shaped or annular electromagnetic coil winding device 24 is accommodated within the inner space D of the casing 81 so that the electromagnetic coil winding device 24 is positioned around the shaft 11. The coil winding device 24 includes a core 25 and a coil winding 27. The core 25 is formed of a magnetic material and has an upper open-faced annular groove 25a. The coil winding 27 is supplied with electric current from an external power supply by way of a pair of harnesses 26. The coil winding 27 is formed on a bobbin 28 in winding mode and is accommodated in the annular groove 25a. The electromagnetic coil winding device 24 is positioned in the annular groove 14b of the rotor 14 and is secured to the housing 81b of the casing 81 by a plurality of bolts 24a. An anti-vibration plate 29 made of a rubber or a resin material is held between the housing 81b and the coil winding device 24.

A ring-shaped or annular armature 30 which is formed of electromagnetic material is fixedly mounted on the lower surface of the movable plate 19. The armature 30 is positioned in the annular groove 14c of the rotor 14 and is located in opposition to the electromagnetic coil winding device 24 with the rotor 14 being located between the armature 30 and the electromagnetic coil winding device 24. Positioning the electromagnetic coil winding device 24 and the armature 30 in the respective annular grooves 14b, 14c of the rotor 14 reduces the axial extent or thickness of the driving device 8, thereby establishing a thinner driving device 8.

The movable plate 19 of the disk assembly 15, the rotor 14, and the electromagnetic coil winding device 24 together constitute a clutch mechanism CL.

When the coil winding 27 of the electromagnetic coil winding device 24 is energized, a magnetite closed loop is produced which circulates through the coil winding 27, the core 25, the rotor 14, and the armature 30. This generates an electromagnetic force attracting the armature 30 toward the rotor 14. Then, the movable plate 19 is brought into axial movement toward the rotor 14 in such a manner that the movable plate 19 is increasingly deformed, which causes a meshing engagement between the geared portion 19a of the movable plate 19 and the geared portion 14a of the rotor 14. Thus, the clutch mechanism CL assumes its ON-condition which allows the rotor 14 to rotate together with the disk assembly 15. At this time, the anti-shock plate 29 decreases the shock sound which is inevitably generated upon meshing engagement between the geared portion 19a of the movable plate 19 and the geared portion 14a of the rotor 14, thereby reducing the resonance sound at the lateral side 2a of the vehicle body 2. Thus, the sound which occurs during the operation of the driving device 8 becomes reduced to a significant extent.

On the other hand, when current application to the coil winding 27 of the electromagnetic coil winding device 27 is interrupted, the foregoing attraction force disappears or is no longer present. The restoration force of the leaf spring 23 thus causes the reverse axial movement of the movable plate 19, thereby releasing the geared portion 19a of the movable plate 19 from the geared portion 14d of the rotor 14. The clutch mechanism CL thus assumes the OFF-condition under which the disk assembly 15 is able to rotate relative to the rotor 14.

An annular magnet 31 is fixedly positioned in the annular groove 14c of the rotor 14. The magnet 31 is positioned outside the magnetite closed loop which circulates through the core 25, the rotor 14, and the armature 30. Thus, the magnet 31 is not affected even when the coil winding 27 is being applied with current. Plural sets of N-pole and S-pole combinations are magnetized alternately along the entire outer periphery 31a of the magnet 31 in such a manner that the N-poles and S-poles are arranged alternately.

A door sensor 32 is provided in the casing 81 and is positioned to oppose the magnet 31. The sensor 32 includes a pair of Hall elements 32a, 32a both of which are secured to a vertical wall 81f of the housing 81b by screws. While the magnet 31 is being rotated, the Hall elements 32a, 32a issue signals, respectively, which are of a phase difference of 90 degrees. This means that the sensor 32 serves for detecting the rotational condition of the rotor 14. Such signals are fed to a CPU 141 of an electronic control device 100 as will be described later and are used to calculate the sliding speed of the slide door 1, the sliding direction of the slide door 1, and the current position of the slide door 1.

A divider 85 is positioned in the casing 81 such that the outer periphery of the divider 85 is held between the housings 81a, 81b. The shaft 11 passes through the divider 85. The divider 85 divides the inner space D of the casing 81 into a first inner sub-space D1 and a second inner sub-space D2. The input wheel 16 of the disk assembly 15 and the speed reduction gear train 20 are accommodated in the first inner sub-space D1, while the output wheel 17 of the disk assembly 15, the movable plate 19, the rotor 14, the electromagnetic coil winding device 24, and the sensor 32 are accommodated in the second inner sub-space D2. Due to this arrangement, the rotor 14, the movable plate 19, and the sensor 32 are not liable to be infiltrated with grease between the idle gear 21 and the input wheel 16 and with metal powder generated by the meshing engagement.

The following is a description of the operation of the driving device 8 in conjunction with slide movement of the slide door 1. To slide the slide door 1, the clutch mechanism 8 is first brought into the ON-condition under which the rotor 14 is rotatable together with the disk assembly 15 due to the fact that the geared portion 14d of the rotor 14 is in meshing engagement with the geared portion 19a of the movable plate 19 while the coil winding 27 of the coil winding device 24 is being energized. Under such a condition, if the electric motor 82 is turned on, the resulting rotation, after passing through the speed reduction gear train 20, rotates the disk assembly 15 and the rotor 14, which causes rotation of the shaft 11, thereby rotating the output gear 12. Thus, the geared cable 6 which is in meshing engagement with the output gear 12 is moved in one direction to open the slide door 1 or in the opposite direction to close the slide door 1. Establishing concurrent rotation of the rotor 14 and the disk assembly 15 causes an electrical operation of the slide door 1 under which the slide door 1 is moved by the electric motor 82. Immediately upon the slide door 1 being brought into its fully opened condition or closed condition, the current application to the coil winding 27 of the electromagnetic coil winding device 24 and the electric motor 82 is turned off.

When the clutch mechanism 8 is in the OFF-condition, the rotor 14 is rotatable relative to the disk assembly 15 due to the fact that the geared portion 14d of the rotor 14 is out of meshing engagement with the geared portion 19a of the movable plate 19 and the coil winding 27 of the coil winding device 24 is not being energized. Under such a condition, manual operation of the slide door 1 is established. That is, if the slide door 1 is moved manually in one direction to open the slide door or is moved in the opposite direction to close the slide door, the resulting movement of the geared cable 6 rotates the shaft 11 due to the fact that the geared cable 6 is in meshing engagement with the output gear 12, The rotor 14 is thus rotated. At this time, the geared portion 14d of the rotor 14 is out of meshing engagement with the geared portion 19a of the movable plate 19 and so rotation of the rotor 14 is not transmitted to the disk assembly 15.

Figure 4:
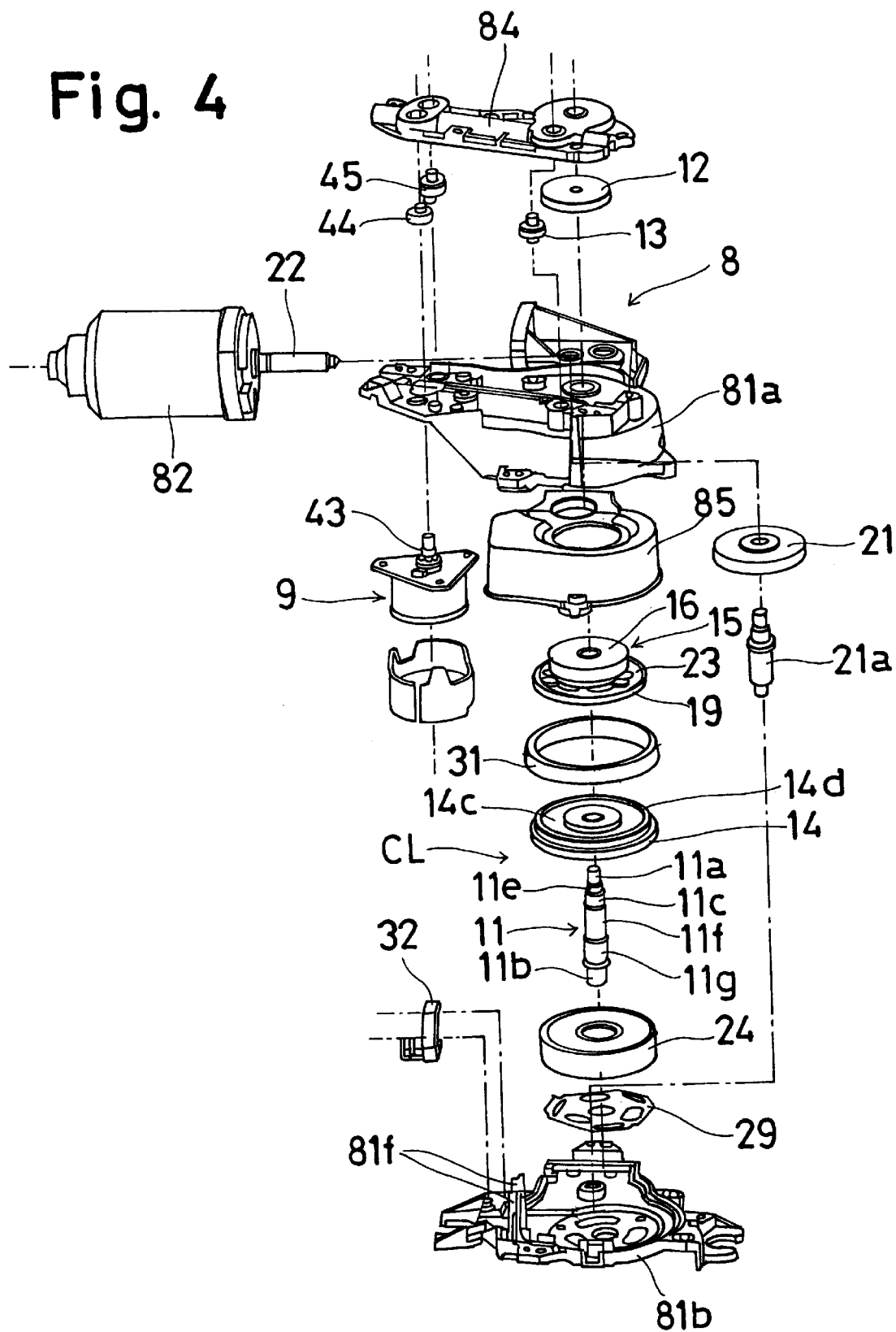
FIG. 4 is an exploded perspective view of the driving device shown in FIG. 3.

As can be understood from the illustration of FIG. 4, the clutch mechanism 8 is provided with a brake device 99.

Figure 8:
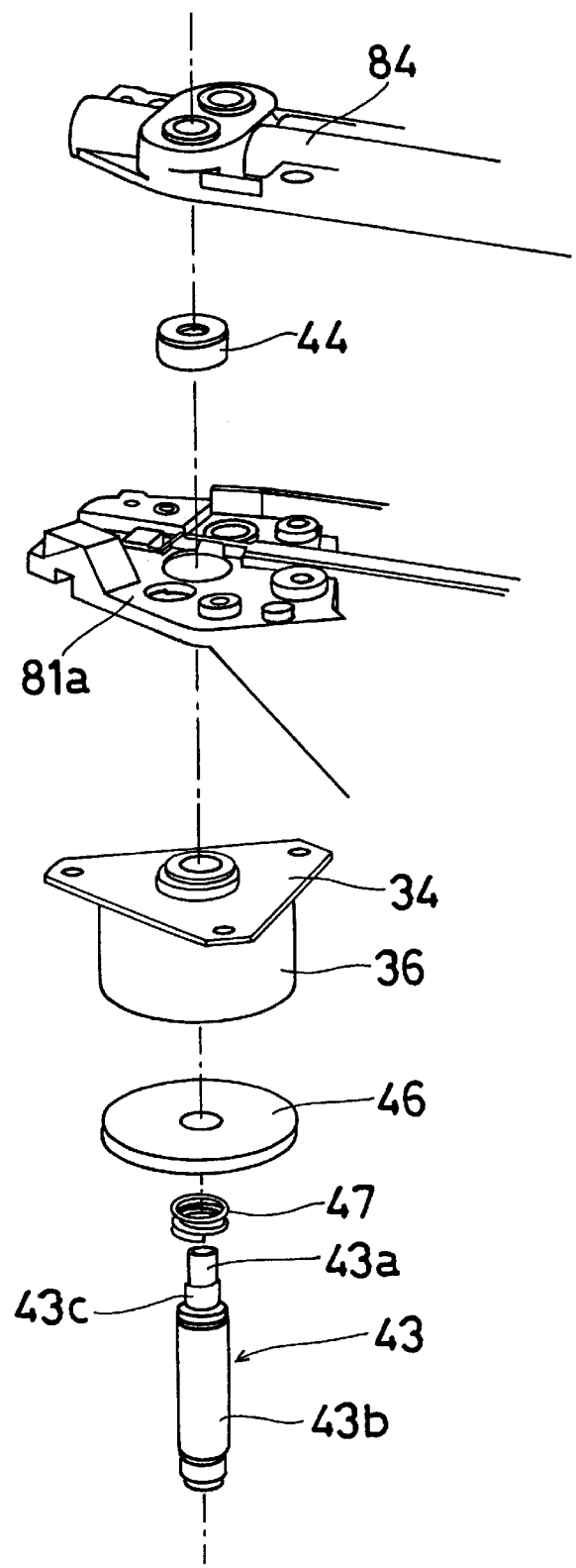
FIG. 8 is an exploded perspective view of the brake device used in conjunction with the driving device shown in FIG. 3.
Figure 9:
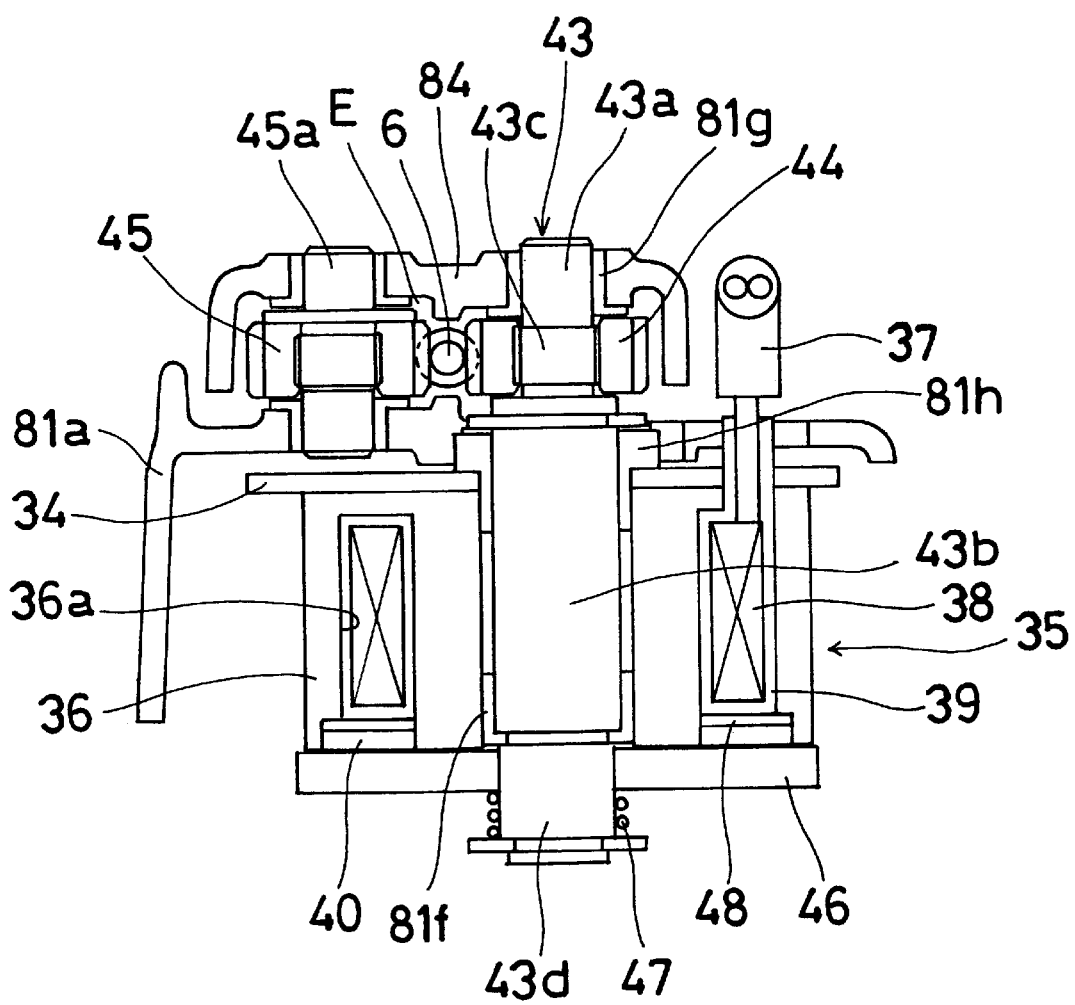
FIG. 9 is a cross-sectional view taken along the section line IX—IX in FIG.3.

With reference to FIGS. 8 and 9, a bracket 34 is secured by bolts to the housing 81a of the casing 81. The bracket 34 is fixed with an electromagnetic coil winding device 35. The coil winding device 35 includes a core 36 and a coil winding 38. The core 36 is formed of a magnetic material and has a lower open-faced annular groove 36a. The coil winding 38 is applied with electric current from an external power supply by way of harness wires 37. The coil winding 38 is mounted on a bobbin 39 and is accommodated in the annular groove 36a. The opening of the annular groove 36a is closed by an annular metal plate 48 and a friction plate 40 in such a manner that the friction plate 40 projects slightly beyond the bottom of the core 36.

A shaft 43 is journalled in the electromagnetic coil winding device 35 via a pair of axially spaced bushes 81g, 81f. The shaft 43 is so positioned as to traverse the accommodating space E after passing through the bracket 34 and the housing 81a. One end side portion 43a of the shaft 43 is journalled in the cover 84 via a bush 81g, and an intermediate portion 43b of the shaft 43 around which the coil winding device 35 is positioned is journalled in both the bracket 34 and the housing 81a via a bush 81h. The shaft 43 is provided with a serration portion 43c between the end portion 43a and the intermediate portion 43b, and is located within the accommodating space E. The other end portion of the shaft 43 defines another serration portion 43d located adjacent or next to the intermediate portion 43b.

A brake gear 44 is mounted on the serration portion 43c of the shaft 43 and is thus rotated together with the serration portion 43c. A driven gear 45 is positioned in the accommodating space E. The driven gear 45 is fixedly mounted on a pin 45a whose opposite end portions are journalled in the housing 81 and the cover 84 respectively. The driven gear 45 is positioned in opposition to the brake gear 44. The brake gear 45 is in indirect meshing engagement with the driven gear 44 via the geared cable 6 which extends through the accommodating space E.

An armature 46 is mounted on the serration portion 43d of the shaft 43 so that the armature is movable along the serration portion 43d of the shaft 43 and is rotatable together with the serration portion 43d of the shaft 43. The armature 46 is formed of a magnetic material and is configured as a circular plate. The armature 46 is urged continually by a spring 47 that is arranged around the shaft 43 so that the armature 46 is in slight face-to-face contact with the friction plate 40.

When the coil winding 38 of the coil winding device 35 is energized, a magnetic closed loop is formed which passes through the coil winding 38, the core 36 and the armature 46, thereby generating an electromagnetic force which attracts the armature toward the rotor 36. Thus, the armature 46 moves along the shaft 43 toward the core 36 so that the armature 46 is strongly brought into engagement with the friction force 40, thereby imparting a large friction force acting as a brake force to the armature 46 under rotation. When the coil winding 38 of the coil winding device 35 is de-energized, there is no magnetic attraction force which attracts the armature toward the core 36, thus allowing the armature 46 to rotate freely relative to the friction plate 40. The reason is that between the friction plate 40 and the armature 46 under rotation, there is a very small amount of friction force which is unable or insufficient to brake the friction plate 40.

The operation of the brake device 99 in conjunction with the movement of the slide door 1 is as follows. While the slide door 1 is moving, the geared cable 6 is also moving in one direction (or the other direction), and the meshing engagement between the geared cable 6 and the brake gear 44 causes the brake gear 44, the shaft 43, and the armature 46 to rotate.

When the slide door 1 is moving by virtue of either the driving operation of the driving device 8, manual operation, or gravity unexpectedly applied to the slide door 1 when the vehicle is parked on a slanted or sloping road, the CPU 141 calculates the sliding speed of the slide door 1 on the basis of the signals issued from the sensor 32. If the detected sliding speed of the slide door 1 exceeds a predetermined value, the coil winding 38 of the coil winding device 35 is energized, and an immediate and strong engagement of the armature 46 with the friction plate 40 occurs, thereby generating a very large friction force between the armature 46 and the friction plate 40. Thus, with little time lag, a braking force is applied to the slide door 1.

The foregoing operation of the brake device 99 is under the control of the CPU 141. The electronic control device 100 allows the operator to move the slide door 1 in a smooth manner when the slide door 1 is switched to the manual mode.

In addition, in the case where no driving device 8 is provided to the vehicle, the brake device 99 can be applied thereto. That is, solely the use of the brake device 99 can be employed. In this structure, the magnet 31 is positioned on the armature 46 and the sensor 32 opposing thereto detects the rotational condition of the armature 46 for determining the sliding speed, the sliding direction, and the current position of the slide door 1.

Figure 10:
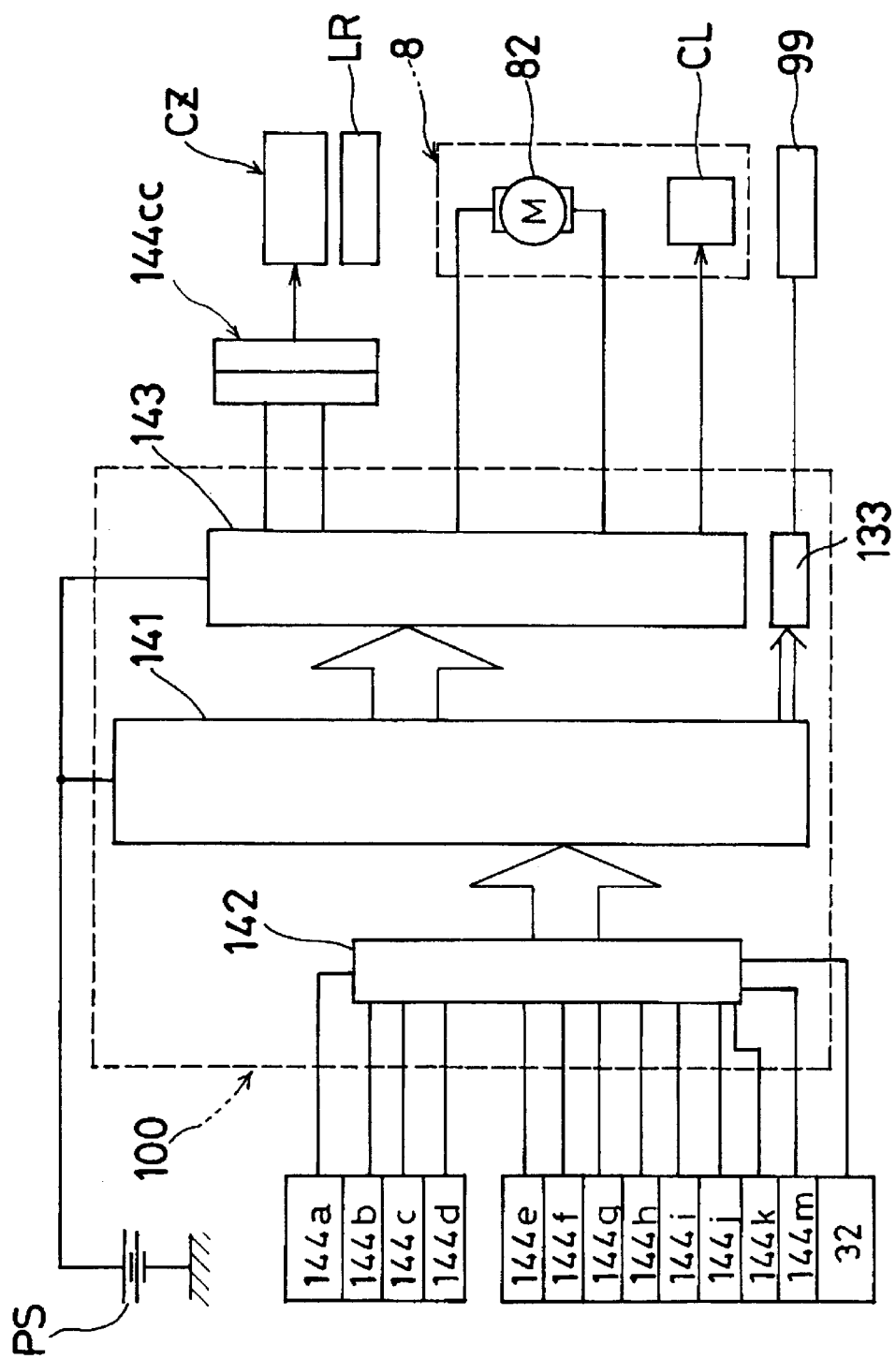
FIG. 10 is a schematic illustration of the electronic control device used in the slide door apparatus of the present invention.
Figure 11:
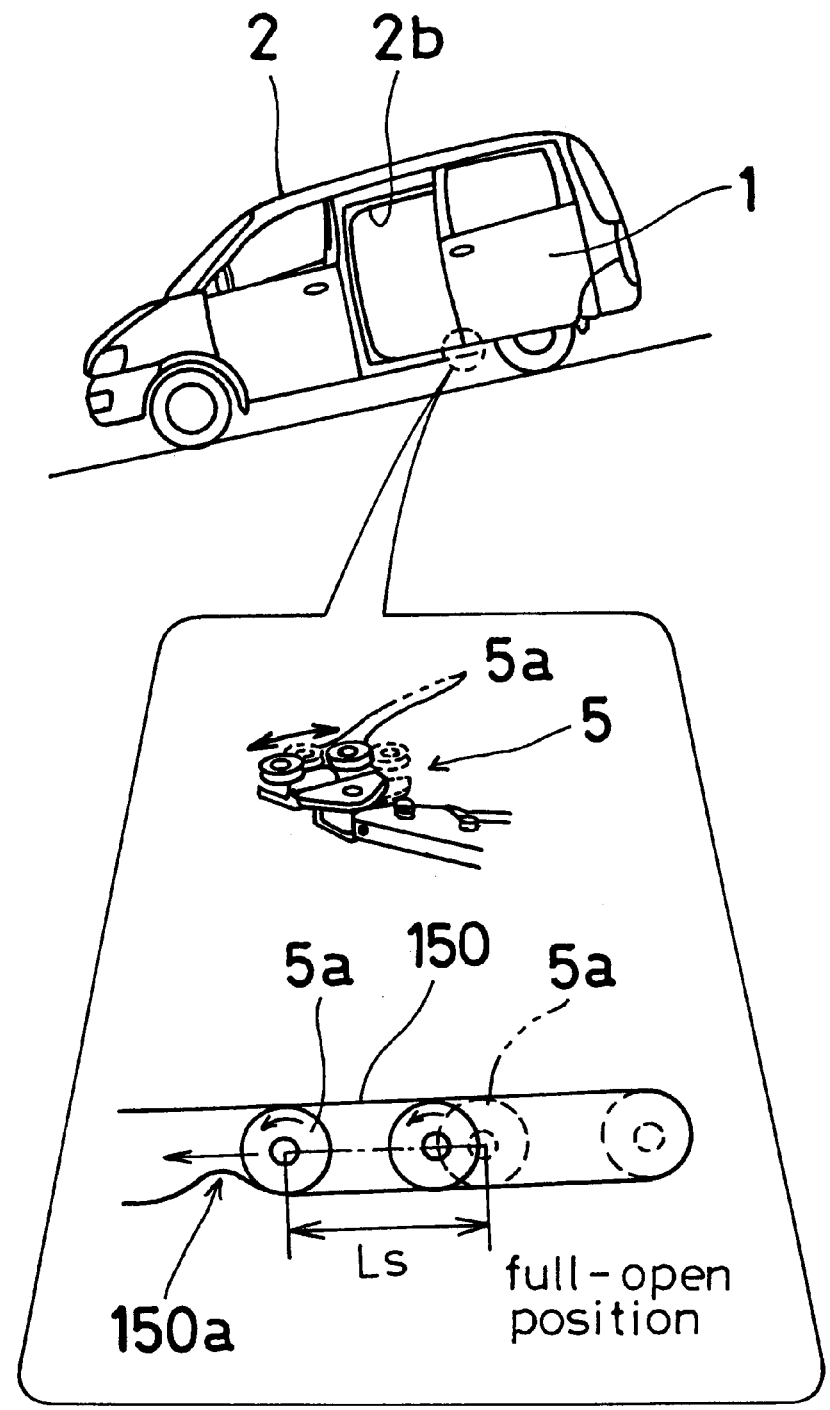
FIG. 11 is a perspective view of a vehicle parked on a sloping surface and a detailed view of a portion of the vehicle illustrating the relationship between a roller and a vehicle body when the vehicle parks on a sloping surface.

FIG. 10 illustrates the electronic control device 100 by which the drive device 8 and the brake device 99 are controlled in the electronic mode. The electronic control device 100 includes the CPU 141, an input interface 142, a driving circuit 143, and a PWM control circuit 133. The input interface 142 is connected with a cancel switch 144a, an operation switch 144b, a junction switch 144c, a pawl switch 144d, a courtesy switch 144e, a touch switch 144f, an ignition switch 144g, a shift sensor 144h, a foot brake sensor 144i, a parking brake sensor 144j, a vehicle speed sensor 144k, an engine sensor 144m, and the door sensor 32. The CPU 141 orders the drive circuit 143 and the PWM control circuit 133 to operate the drive device 8 and the brake device 99, respectively, on the basis of signals fed from each of the switches and sensors.

The cancel switch 144a is used, when turned on, to invalidate the power slide control mode of the slide door 1. In other word, when the cancel switch 144a is closed, the slide door 1 is only movable manually. The operation switch 144b is used to open the slide door 1 which is under the power slide mode when the switch 144b is brought into a first closed position and is used to close the slide door 1 which is under the power slide mode when the switch 144b is brought a second closed position.

The junction switch 144c is provided between the lateral side 2a and the slide door 1. The junction switch 144c is closed when the slide door 1 is closed to close the opening area 2b and is opened immediately when the slide door 1 is opened to open the opening area 2b. The junction switch 144c has a power supply portion 144cc through which electric power is supplied from the body side to a closer CZ and a latch releaser LR.

The pawl switch 144d is associated with the closer CZ and is closed when the slide door 1 is in the full-latched condition or the half-latched condition. The courtesy switch 144e is closed when the slide door is in the opened condition or the half-latched condition. The touch switch 144f is closed when a substance, item, or a portion of human body is held between the vertical inner periphery of the opening area 2b and the slide door 1 which is being closed. The closer CZ is used to bring the slide door 1 from its half-latched condition to its fully-latched condition when the slide door 1 is being closed, while the latch releaser LR is used to release the latched condition of the slide door 1 when it is opened.

Figure 12A:
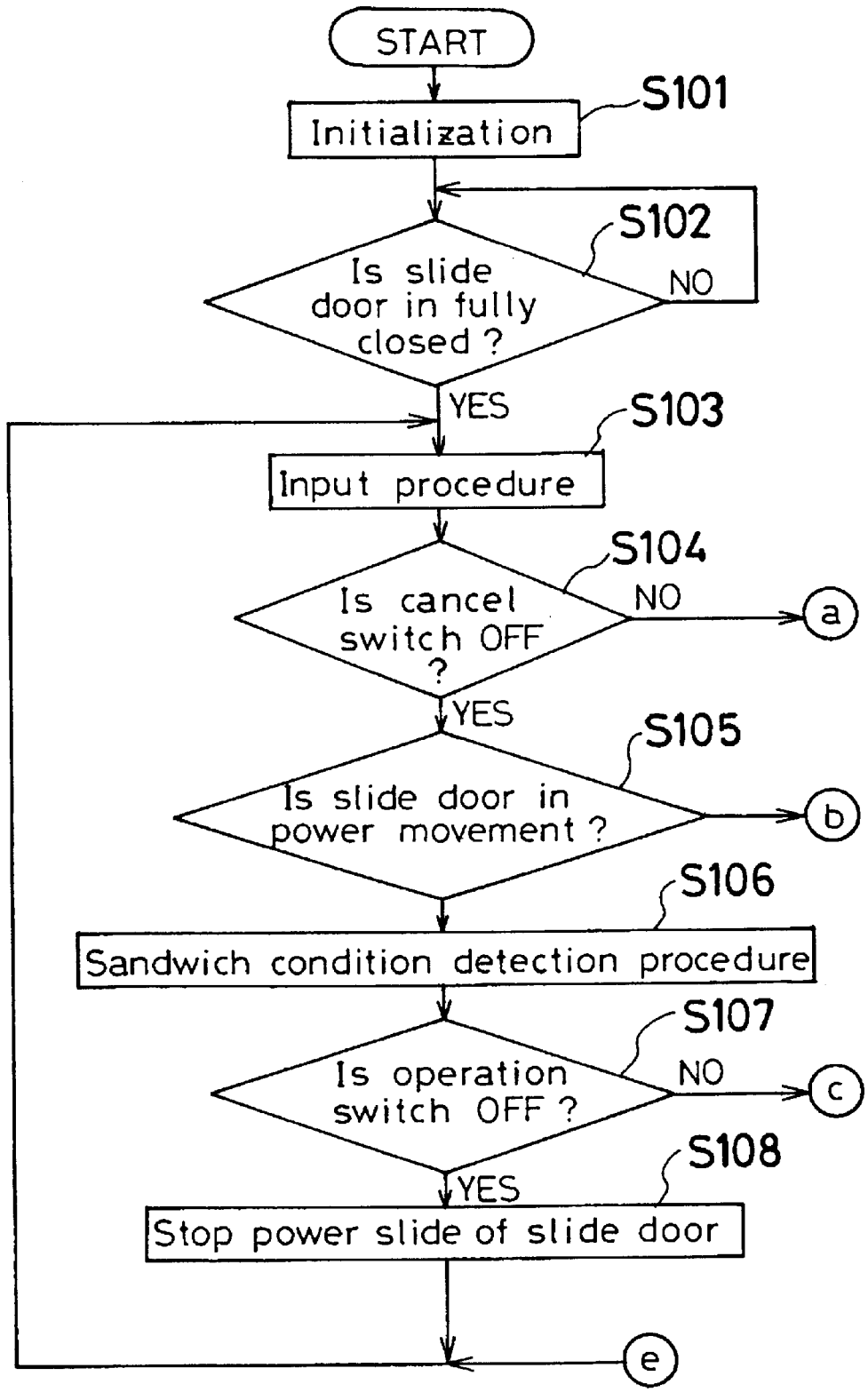
FIGS. 12A–12C illustrate a flowchart of the main program of the electronic control device shown in FIG. 10.
Figure 12B:
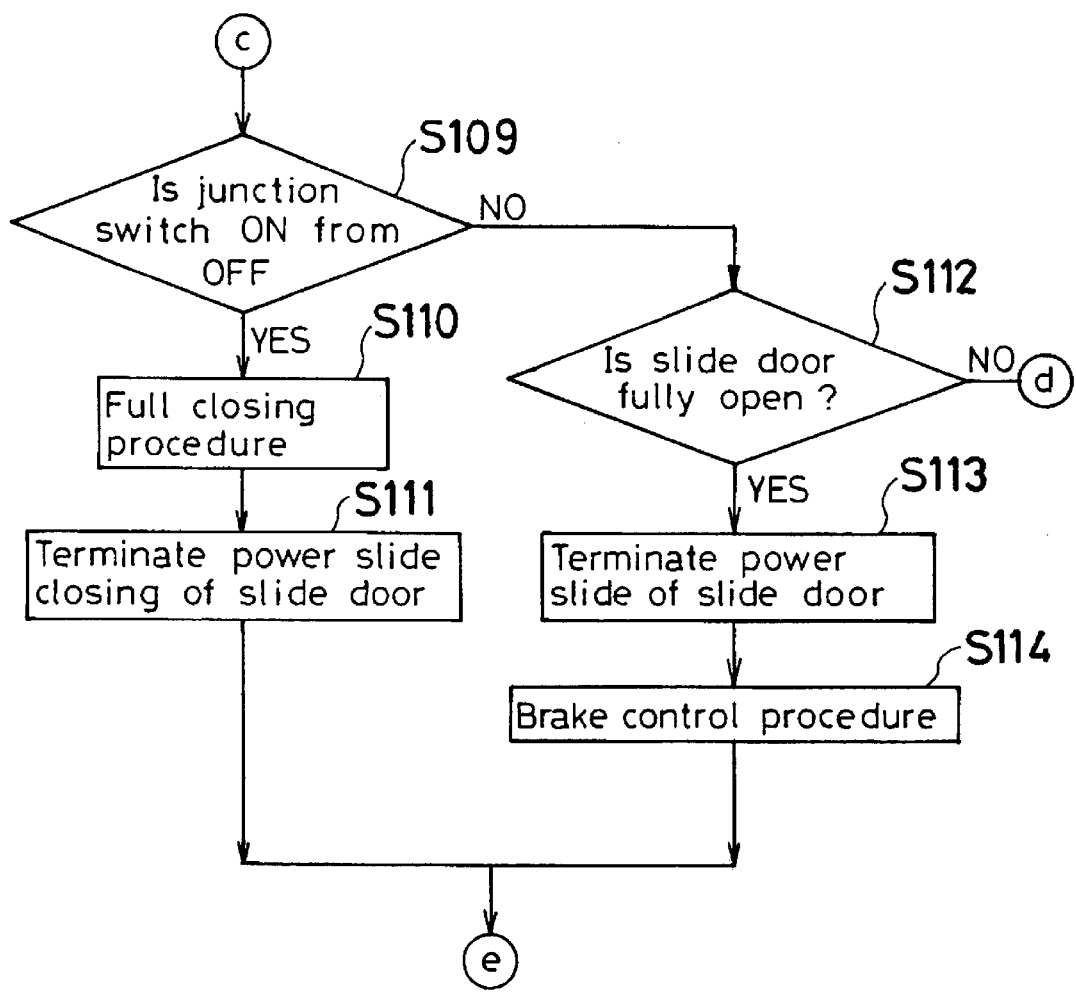
Figure 12C:
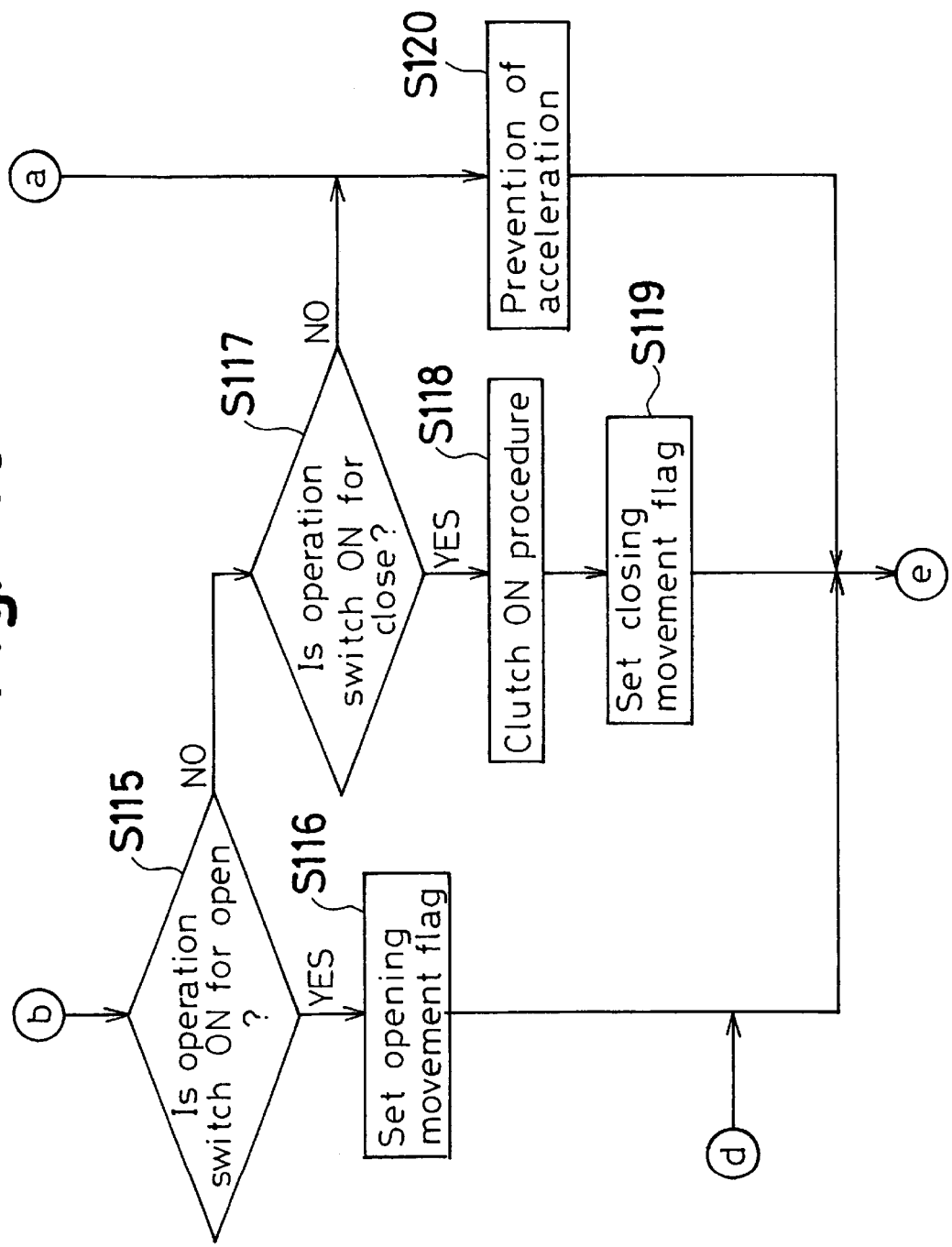

The following is an explanation of the operation of the electronic control device 100 for opening and closing the slide door 1. The electronic control device 100 is turned on when an amount of electric power is supplied thereto from a power source PS, with the main routine shown in FIGS. 12A–12C then being executed. At step S101, initialization is made to check system conditions and to set counters and so on to zero or other starting values. At step S102, it is determined whether or not the slide door 1 is in the fully closed condition. The closure of the pawl switch 144d and the opening of the courtesy switch 144e are indicative of the fully closed condition of the slide door 1. If the slide door is in the fully closed condition, an input procedure is executed at step S103 in which information from the switches and sensors are fed to and stored in the CPU 141.

Figure 16:
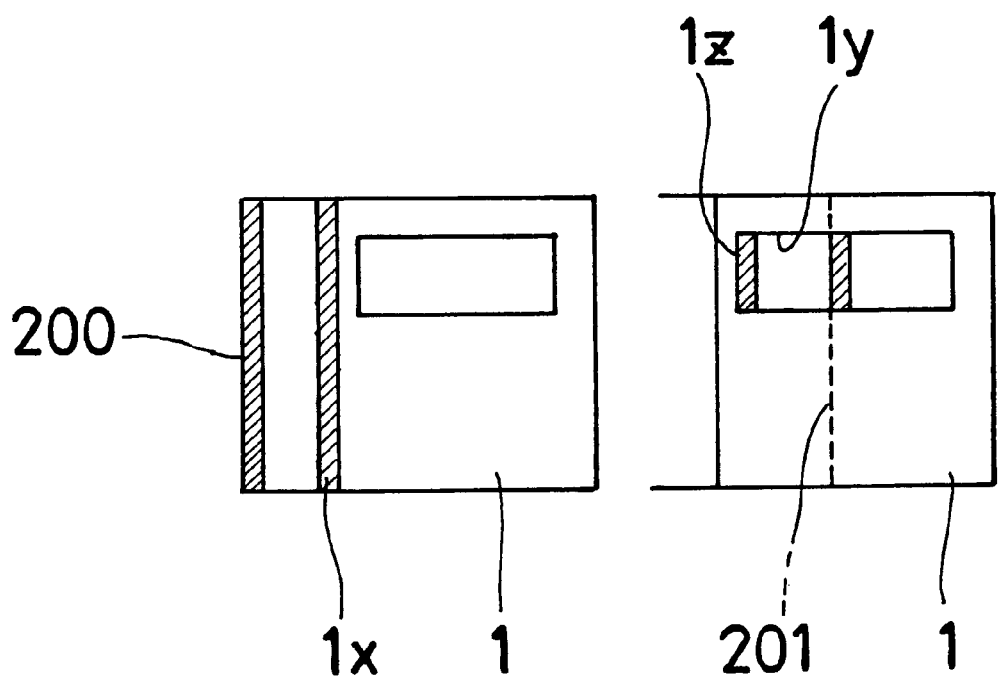
FIG. 16 shows portions of a moving member at which sandwiched conditions occur.

At step S104, it is determined whether or not the cancel switch 144a is turned off. If the result is No, the program proceeds to step S120 at which the acceleration prevention control is made for controlling the movement of the slide door 1 which is under manual operation mode, and thereafter the control returns to step S103. However, if the result of step S102 is Yes, step S105 is executed to determine whether or not the slide door 1 is in the power movement. This is accomplished by checking the opening movement flag and closing movement flag. If the result is No, the program proceeds to step S106. If the result in step S105 is Yes, at step S109 the sandwiched condition detection procedure is executed to check whether or not a sandwiched or pinched condition occurs at the side of pillar. As seen with reference to FIG. 16, a sandwiched or pinched condition may occur between a front pillar 200 and a front side 1x of the slide door 1 which is undergoing closing movement, and another sandwiched condition may occur between a rear pillar 201 and a front side 1z of a window opening 1y of the slide door 1.

At step S107, it is determined whether or not the operation switch 144b is opened. If the operation switch 144b is opened, the program proceeds to step S108 at which the power slide movement of the slide door 1 is stopped by resetting the opening and closing movement flags with the clutch mechanism CL ON condition and turning the motor 82 off. Thereafter, the control returns to step S103.

If the determination in step S105 is No, step S115 is executed to check whether or not the opening switch 144b is closed to open the slide door 1. This check is made simultaneously with the closure of the operation switch 144b. If the result is Yes, at step S116, the opening movement flag is set, and thereafter the control goes to step S103.

If the result of step S115 is no, a determination is made in step S117 concerning whether the operation switch 144b is closed to the slide door 1. This check is made simultaneously with the closure of the operation switch 144b. If the result is Yes, step S118 is executed and the clutch ON procedure is carried out. In this procedure, when the operation switch 144b is closed for operating the slide door 1 under power slide mode or when the slide door 1 under manual operation mode moves a distance in the closing direction, the clutch mechanism CL is brought into the ON condition to move the slide door 1 under the power slide mode. In such an operation, if the closing speed of the slide door 1 exceeds a set or predetermined value, the slide door 1 is applied with a braking force from the brake device 99 to lower the speed below a set value before the clutch mechanism CL becomes the ON condition. After completion of clutch ON procedure, step S119 is executed to set the closing movement flag, and the control goes to step S103.

At step S107, if the operation switch 144b is found to be closed either in opening or closing direction, step S109 is executed to check whether the junction switch 144c is switched from its OFF condition to its ON condition. The junction switch 144c has opposed male and female portions which are provided at the slide door 1 and the vehicle body 2, respectively. The junction switch 144c is closed when the slide door 1 reaches a position spaced about ten mm from the fully closed position of the slide door 1. If the result of step S109 is Yes, at step S110 the full closing operation is executed to close the slide door 1 fully by driving the closer CZ. Then, at step S111, the power slide closing operation is terminated by turning off the motor 82 and the clutch mechanism CL and resetting the closing movement flag. Then the control returns to step S103.

If the result of step S109 is No or the junction switch 144c is still not brought into the closed condition, step S112 is executed to check whether or not the slide door 1 has reached its fully opened condition under the power slide opening movement. If the result is No, the control returns to step S103. If the result of step S112 is Yes, the power slide opening movement is terminated by turning off the motor 82 and the clutch mechanism CL and resetting the opening movement flag at step S113. Then, at step S114, the brake control procedure is executed to bring the roller 5a of the roller unit 5 of the slide door 1 into engagement with a retaining portion 150a of a check spring 150. Such a condition ensures that even if the vehicle parks on a slanted or sloping road, the slide door 1 fails to climb over the retaining portion 150a due to the gravity applied to the slide door 1 when the clutch mechanism is in the OFF condition.

Figure 13:
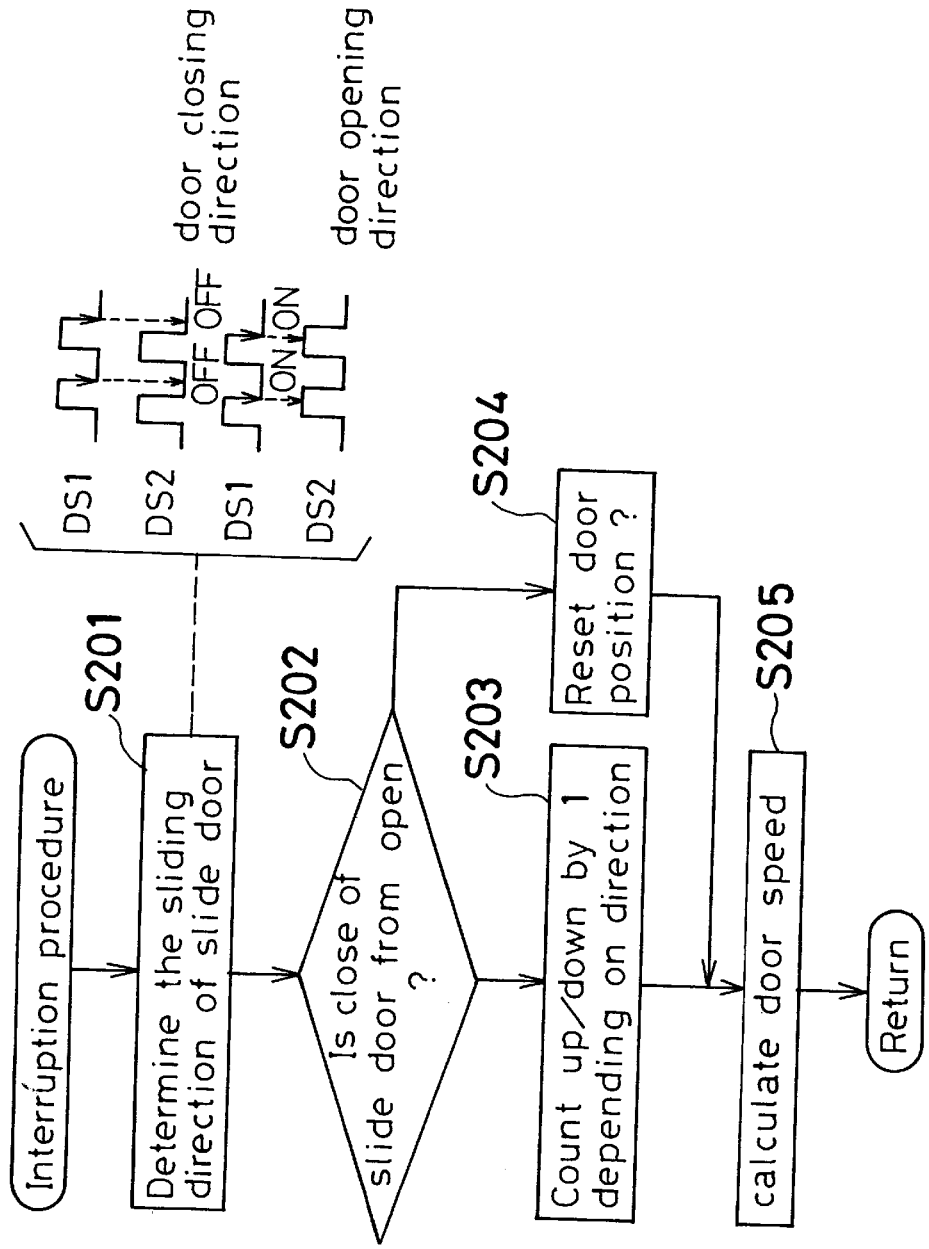
FIG. 13 is a flowchart showing the program for the interruption procedure of the electronic control device shown in FIG. 10.

Referring to FIG. 13, the interruption procedure is as follows. Interruption is made to the main routine whenever the rising and falling edges of each of signals from the sensor 32 are fed to the CPU 141. At step S201, the moving direction of the slide door 1 is recognized by comparing signals from the respective hall elements 32a, 32a of the sensor 32. As previously explained, the phase of the signal from one of the Hall elements 32a differs 90 degrees from the phase of the other. Thus, as indicated in step S201 of FIG. 13, when the falling edge of the signal from one of the Hall elements 32a coincides with the bottom of the signal from the other Hall element 32a, the slide door 1 can be said to be under closing movement. On the other hand, when the falling edge of the signal from one of the Hall elements 32a, is in coincidence with the top of the signal from the other Hall element 32a, the slide door 1 can be said to be under opening movement.

At step S202, it is determined whether or not the movement of the slide door 1 from its open condition has occurred. If the result of step S202 is No, step S203 is executed to increment the counter by counting up and down when the CPU 141 detects the falling edge of each of signals from the sensor 32 if slide door 1 is being opened and closed, respectively. If the result of step S202 is Yes, the counter is reset to zero which is indicative of the reference or criteria position of the slide door 1 at step S204. At step S205, considering that a time duration between any two adjacent falling edges of the signal is constant, an inverse of such a time duration is defined as the moving speed of the slide door 1. Thus, the current position, moving speed, and moving direction of the slide door 1 can be obtained.

The sandwiched or pinched condition detection procedure is as follows. The basic concept of this procedure is that when the vehicle parks on a slanted or sloping road, the sliding speed of the slide door 1 in its closing direction is in the form of a rippled speed wherein acceleration and deceleration alternate which depicts a damped vibration. In light of the fact that with a higher speed of the slide door 1, the speed decrease thereof is larger, plural threshold values (levels 1–4) are set which correspond to the plural speed ranges of the slide door 1. In addition, in light of the fact that the amplitude of the damped wave is in proportion to the speed of the slide door 1, to ensure the correct detection sandwich condition, the threshold value remains unchanged when the speed decrease thereof is not less than a threshold extension value.

Figure 14A:
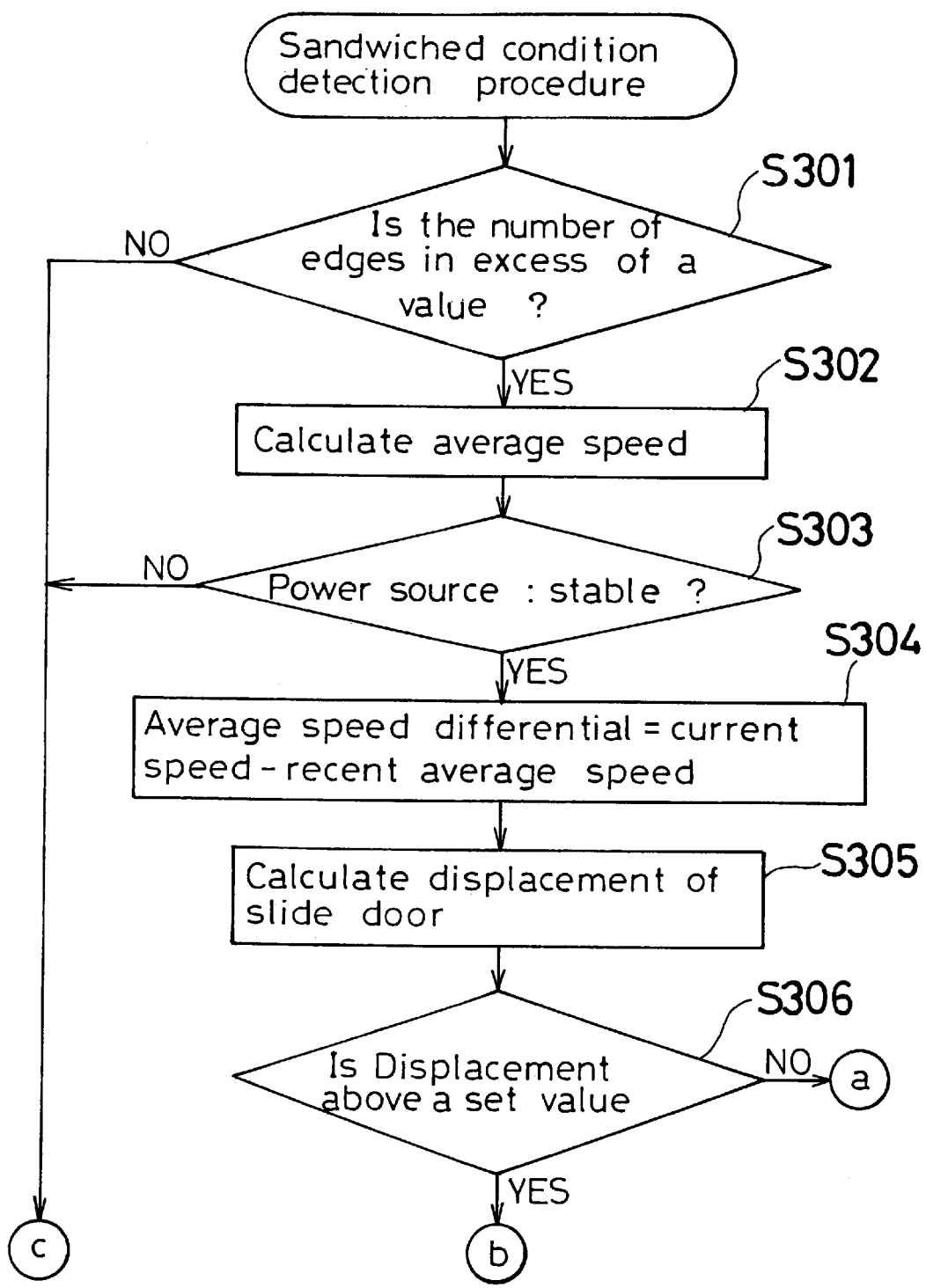
FIGS. 14A–14C illustrate a flowchart showing the program for the sandwich condition detection procedure of the electronic control device shown in FIG. 10.
Figure 14B:
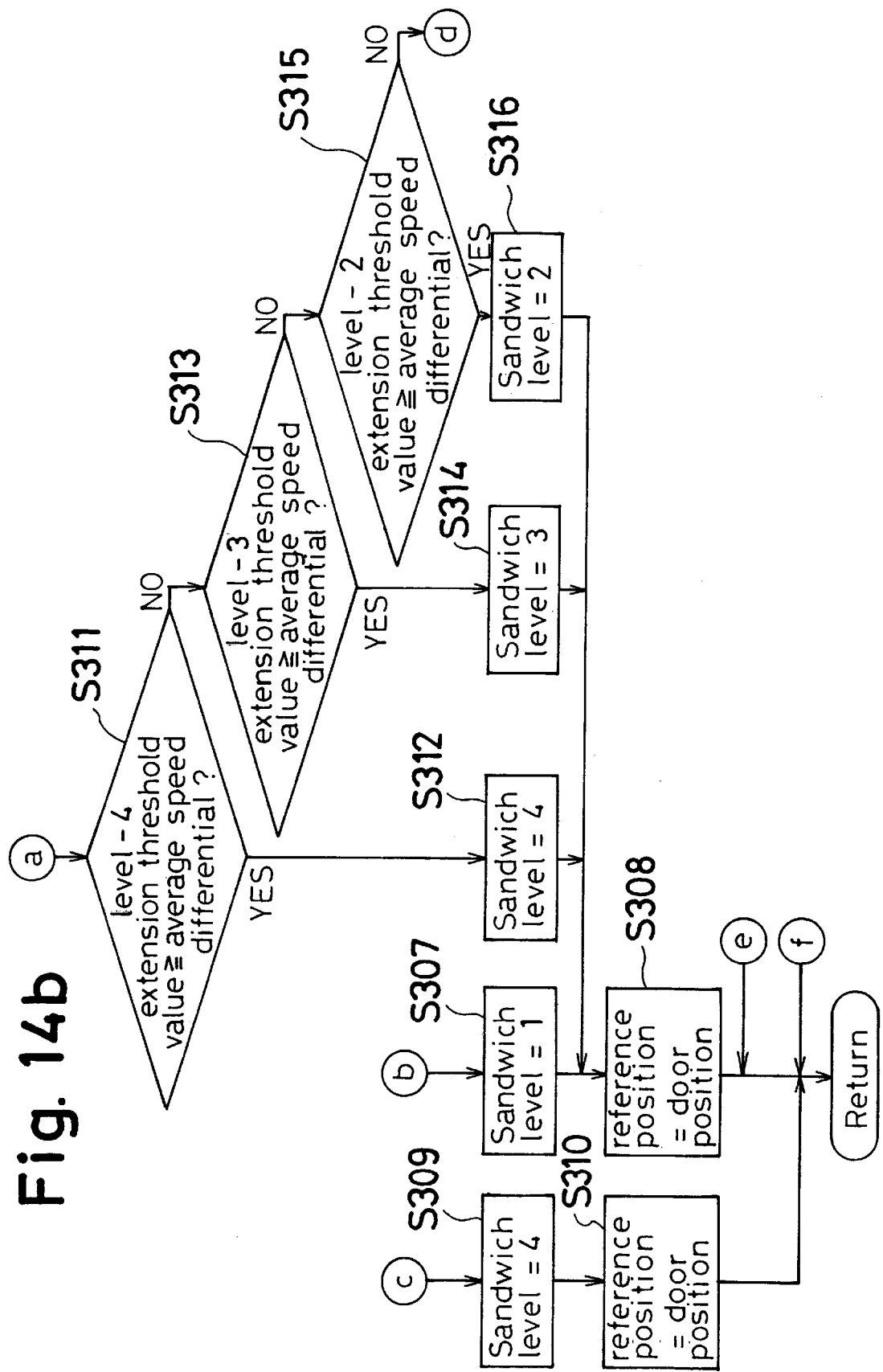
Figure 14C:
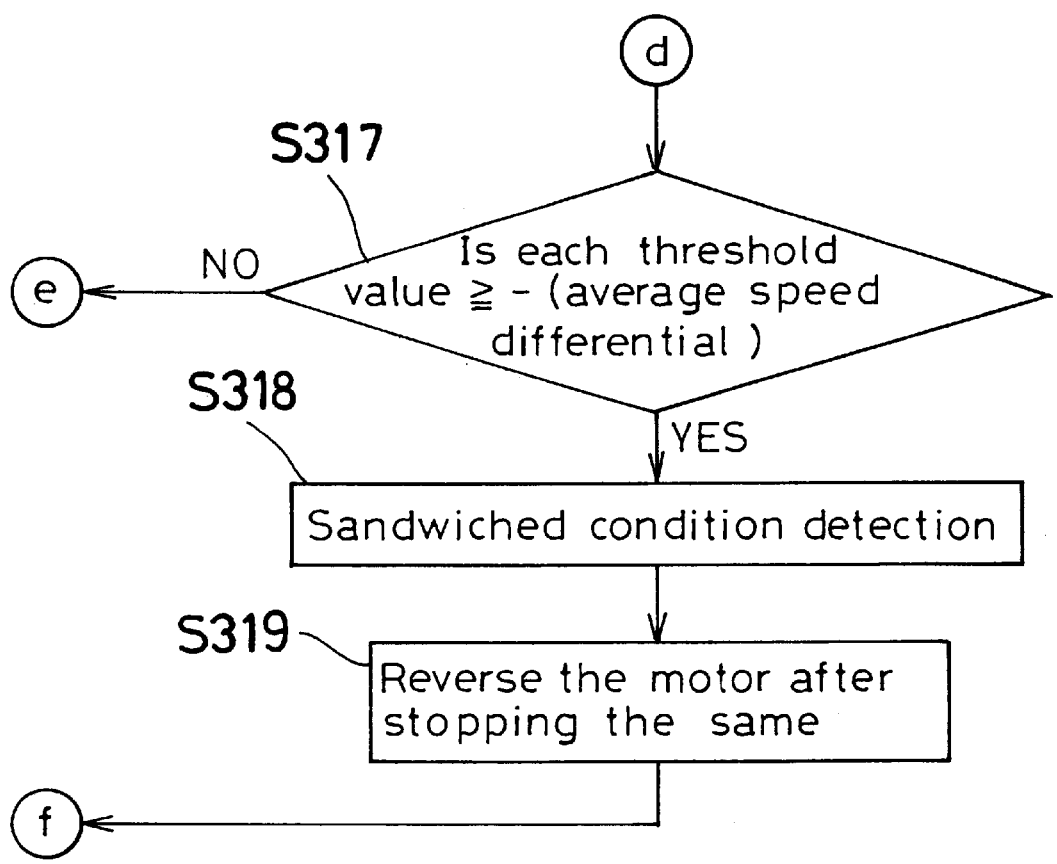

With reference to FIGS. 14A–14C, at step S301, it is determined whether or not the number of pulse edges of the signal from the sensor 32 exceeds a predetermined value of, say, 40. If the result is No, step S309 is executed to establish that the sandwich level=4 which is indicative the maximum sandwich threshold value. Thereafter, step S310 is executed to replace the reference position with the current door position at which such a change of threshold value. Then, the control terminates this procedure.

If the result of step S301 is Yes, step S302 is executed to calculate an average speed. This average speed is calculated on the basis of 40 inverses of time duration each of which is between any two adjacent falling edges of the signal is constant. This method takes into account ripples due to change of the sliding speed of the slide door 1. At step S303, it is checked whether or not the voltage from the power source PS is stable a time of 50 microseconds before being supplied to the control device 100. This check is made to measure whether or not such a voltage lowers a predetermined value of, say, 2 volts. If the result is No, the control goes to step S309. If the result of step S303 is Yes, step S304 is executed to calculate an average speed differential by subtracting the average speed of the recent 10 edges from the current speed of the slide door 1. At step S305, a displacement of the slide door 1 from the reference position is calculated on the basis of the number of edges. At step S306, it is determined whether or not such a displacement exceeds a set value of, say, 72.5 mm. If the result is Yes, step S307 is executed to move down the sandwich or pinching level to level 1. Then, the control goes to step S308.

If the result of step S306 is No, at step S311 it is checked whether or not the average speed differential calculated at step S304 is not less than a level-4 extension threshold value of 1000 rpm. At step S313, it is determined whether or not the absolute value of the speed differential calculated at step S304 is not less than a level-3 extension threshold value of 350 rpm. At step S315, it is determined whether or not the absolute value of the average speed differential calculated at step S304 is not less than a level-2 extension threshold value of 150 rpm. Steps S312, S314, and S316 are executed to move down the sandwich level to level-4, level-3, and level-2, respectively.

After execution of each of the steps S307, S312, S314, and S316, step S308 is executed to bring that the reference position is replaced with the current door position at which such a change of threshold value. Then, the control terminates this procedure.

Figure 15:
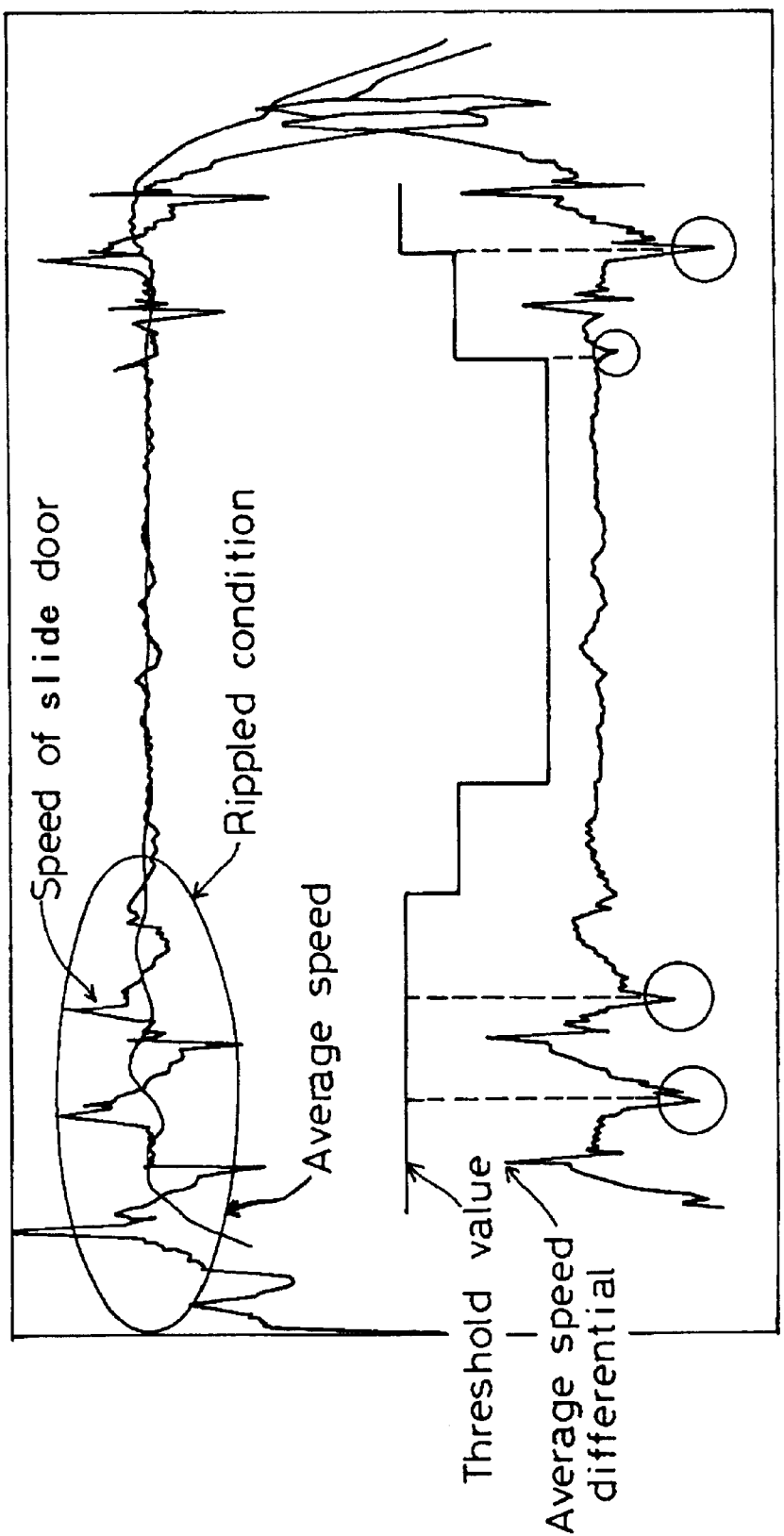
FIG. 15 shows the relationship between the speed of the slide door, the average speed, and other related characteristics.

In each of the foregoing steps S311, S313, and S315, the sandwich or pinch detection threshold is calculated from the view point of an acceleration side (indicated with a circled portion in FIG. 15) of the slide door 1 which is based on the speed differential.

At step S317, it is checked whether or not the threshold value of each of the levels is not smaller than the negative of the speed differential calculated at step S304. If the result is No, the control terminates this procedure due to the fact that the sliding speed of the slide door is found not to be lowered by the pinch or sandwich condition. If the result is Yes, a sandwich or pinched condition is recognized at step S317, which causes at step S318 a termination of the motor 82 and successive reverse rotation thereof for a time duration of 100 ms.

That is to say, the sandwich level (1–4) is established at the acceleration side on the basis of the average speed differential calculated from the sliding speed of the slide door 1 and is compared to the deceleration side condition of the speed differential. The sandwich level varies with a wavy or rippled average speed differential of the slide door 1, thereby enabling the detection of the pinched or sandwiched condition with precision.

In accordance with the present invention, a device for preventing a pinched or sandwiched condition includes the first member (e.g., a lateral side of the vehicle body) provided with an opening area, a second member (e.g., a slide door) that opens and closes the opening area of the first member, and an electronic control device that detects a sandwiched or pinched condition between the first member and the moving second member when a deceleration side condition of the speed of the second member exceeds a threshold value which is obtained based on an acceleration side condition of the speed of the second member. The sandwiched condition can thus be detected with as great a precision as possible even if a change of speed occurs. The reason is that a change of the deceleration side can be estimated in light of the symmetrical nature between the acceleration side and the deceleration side of the speed of the second member.

The threshold value remains unchanged or is shifted to another value when larger and smaller changes, respectively, occur in the speed of the second member. This ensures correct setting of the threshold value depending on the speed of the second member, thereby preventing an unexpected detection of the sandwiched condition. By lowering the threshold value when the speed of the second member becomes smaller, the load applied to the sandwiched condition gets smaller.

The threshold value is also shifted to an upper value when the change in speed becomes larger again after the threshold value has been shifted to the lower value. Thus, the proper setting of the threshold value can be made in view of speed changes. It is to be noted that the present invention can be applied to power operated window and a sun roof device in addition to the foregoing slide door device.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A vehicular slide door apparatus comprising:
   a plurality of guide rails mounted on a lateral side of a vehicle body possessing an opening area;
   a slide door mounted on the guide rails for sliding movement in a lengthwise direction of the vehicle body between an open position in which access through the opening area is permitted and a closed position in which access through the opening area is prevented;
   a drive device operatively associated with the slide door to move the slide door between the closed position and the open position, with the slide door moving at a speed having an acceleration side condition; and
   an electronic control device that detects a sandwiched condition between the slide door and a portion of the vehicle body during sliding movement of the slide door, said electronic control device detecting the sandwiched condition on the basis of a threshold value which is obtained based on the acceleration side condition of the speed of the slide door.

2. The vehicular slide door apparatus as set forth in claim 1, wherein said electronic control device detects the sandwiched condition when a deceleration side condition of the speed of the slide door exceeds the threshold value.

3. The vehicular slide door apparatus as set forth in claim 1, wherein the threshold value remains unchanged when a relatively large change occurs in the speed of the slide door and is shifted to a lower value when a relatively smaller change occurs in the speed of the slide door.

4. The vehicular slide door apparatus as set forth in claim 1, wherein the threshold value changes based on changes in the speed of the slide door.

5. The vehicular slide door apparatus as set forth in claim 1, wherein the threshold value is shifted to an upper threshold value when a change of the speed of the slide door becomes larger again after the threshold value has been shifted to a lower threshold value.

6. A vehicular slide door apparatus comprising:
   a slide door mounted on a lateral side of a vehicle body which possesses an opening area for sliding movement in a lengthwise direction of the vehicle body between an open position in which access through the opening area is permitted and a closed position in which access through the opening area is prevented;
   a drive device operatively associated with the slide door to move the slide door between the closed position and the open position; and
   an electronic control device that detects a sandwiched condition between the slide door and a portion of the vehicle body during sliding movement of the slide door, said electronic control device detecting the sandwiched condition based on a speed of the slide door.

7. The vehicular slide door apparatus as set forth in claim 6, wherein said electronic control device detects the sandwiched condition when a deceleration side condition of the speed of the slide door exceeds a threshold value that is determined on the basis of the speed of the slide door.

8. The vehicular slide door apparatus as set forth in claim 7, wherein the threshold value remains unchanged when a relatively large change occurs in the speed of the slide door and is shifted to a lower value when a relatively smaller change occurs in the speed of the slide door.

9. The vehicular slide door apparatus as set forth in claim 7, wherein the threshold value changes based on changes in the speed of the slide door.

10. A device for preventing a sandwiched condition comprising:
    a first member provided with an opening area;
    a second member opening and closing the opening area of the first member; and
    an electronic control device detecting a sandwich condition between the first member and the second member which is in movement at a speed for closing the opening area of the first member when a deceleration side condition of the speed of the second member exceeds a threshold value which is obtained based on an acceleration side condition of the speed of the second member.

11. A device for preventing sandwiched condition as set forth in claim 10, wherein the threshold value remains unchanged when a relatively large change occurs in the speed of the second member and is shifted to a lower value when a relatively smaller change occurs in the speed of the second member.

12. A device for preventing sandwiched condition as set forth in claim 10, wherein the threshold value is shifted to an upper one when the change of the speed becomes larger again after the threshold value has been shifted to a lower threshold value.

* * * * *